(12) United States Patent
Yano

(10) Patent No.: US 6,332,654 B1
(45) Date of Patent: Dec. 25, 2001

(54) GRADE-HOLDING BRAKE SYSTEM

(75) Inventor: Takuto Yano, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/237,353

(22) Filed: Jan. 26, 1999

(30) Foreign Application Priority Data

May 21, 1998 (JP) .................................................. 10-140175

(51) Int. Cl.$^7$ ...................................................... B60T 17/16
(52) U.S. Cl. ................................................ 303/89; 188/353
(58) Field of Search ............................. 303/191, 192, 303/198, 89, 84.2; 188/353, 265

(56) References Cited

U.S. PATENT DOCUMENTS

| 3,645,352 | * | 2/1972 | Stark et al. | 188/353 |
| 3,684,049 | * | 8/1972 | Kimura | 303/89 |
| 3,893,698 | * | 7/1975 | Fontaine | 303/89 |
| 4,446,950 | * | 5/1984 | Wise et al. | 188/353 |
| 4,717,207 | * | 1/1988 | Kubota et al. | 188/353 |
| 5,415,467 | * | 5/1995 | Utz et al. | 303/89 |
| 5,505,528 | * | 4/1996 | Hamman et al. | 303/89 |
| 5,722,517 | * | 3/1998 | Sayama | 188/353 |

FOREIGN PATENT DOCUMENTS

| 61-200053-A | * | 9/1986 | (JP) | 188/353 |
| 8-48222 | | 2/1996 | (JP) . | |

* cited by examiner

Primary Examiner—Robert J. Oberleitner
Assistant Examiner—Thomas J. Williams
(74) Attorney, Agent, or Firm—Sughrue Mion, PLLC

(57) ABSTRACT

In most vehicles, it is necessary to manually operate the parking brake whenever the vehicle is stopped. The manual brake operation is fatiguing and liable to make the driver feel that the operation is troublesome. A controller 10 controls a cut-off valve 8 to close in a vehicle stopping condition, and even if a brake pedal 1 is released, a pressure within a wheel cylinder 6 is held to thereby maintain a braking force. Also, when an accelerator pedal 11 is depressed when the brake hydraulic pressure is maintained within the wheel cylinder 6, the controller 10 controls the cut-off valve 8 in the open condition so that the pressure within the wheel cylinder 6 is reduced to release the brake.

19 Claims, 21 Drawing Sheets

GRADE-HOLDING BRAKE SYSTEM

BACKGROUND OF THE INVENTION

1. Field of the Invention

The present invention relates to an automotive vehicle brake assembly, and more particularly to a so-called grade-holding brake system for keeping a vehicle stopped after the vehicle has halted.

2. Description of the Related Art

Recently, grade-holding brake system assemblies for automotive vehicles have been developed that automatically apply the brakes to make it possible to easily start off in a vehicle, such as an automobile on a slope without abrupt pedal changes from the brake pedal to the accelerator pedal, or that dispense with the need to continuously step on the brake pedal while waiting for a traffic signal to change or during traffic jams to thereby moderate fatigue caused by the brake operation.

Conventionally, such a type of a grade-holding brake system is disclosed in, for example, Japanese Patent Application Laid-Open No. 8-48222. In this conventional assembly, when the vehicle is halted and the parking brake is applied, the braking force is increased to automatically apply the brakes to reduce the fatigue caused by the driver's brake operation and also to positively maintain the halted condition of the vehicle.

However, when moving in a traffic jam and utilizing the grade-holding function of the above-described conventional assembly, it is necessary to operate the parking brake each time the vehicle comes to a halt. Also, in many vehicles, the parking brake is manually operated. Such manual operation is liable to be troublesome for the driver and make him feel fatigue. Accordingly, there is a problem in that the driver may feel that the operation of the parking brake is troublesome, and ultimately feel fatigued.

Further, the above-described problem occurs not only when moving in traffic jams but also when starting the vehicle off on a slope.

Accordingly, in order to eliminate or alleviate the above-described problems, it is an object of the present invention to provide a grade-holding brake system which makes it possible to readily start off a vehicle on a slope without the necessity of abrupt pedal changes from a brake pedal to an accelerator pedal, which dispenses with the need to continuously step on the brake pedal when waiting for a traffic signal to change or during traffic jams to thereby moderate the fatigue caused by the brake operation, and without making a driver feel that the operation is troublesome.

According to one aspect of the present invention, there is provided a grade-holding brake system for a vehicle comprising: a master cylinder connected to a booster device for amplifying a brake force applied by a driver to a brake pedal; a wheel cylinder for converting a pressure fed from said master cylinder into a braking force for a wheel; a brake switch for detecting an amount of depression of the brake pedal; an accelerator switch for detecting an amount of an accelerator pedal depression; a vehicle speed sensor for detecting a speed of a vehicle on which the brake system is mounted; a pressure controlling means for controlling the pressure within said wheel cylinder independently of the operation of the brake pedal; and a controller for controlling actuation of said pressure controlling means for controlling the pressure within said wheel cylinder. The controller, for controlling the pressure within said wheel cylinder, performs: a brake pedal depression detecting step for detecting whether the brake pedal is being depressed or not on the basis of a detection signal of said brake switch; an accelerator pedal depression detecting step for detecting whether said accelerator pedal is being depressed on the basis of a detection signal of said accelerator switch; a vehicle halted determination step for determining a vehicle halt state of the vehicle on the basis of a detection signal of said vehicle speed sensor; a holding condition establishment step for establishing a brake holding condition for holding a braked condition of a brake at least when the brake pedal is depressed and when the vehicle is in the vehicle halted condition; a holding condition release step for establishing a brake release condition for releasing the braked condition of the brake at least when the accelerator pedal is depressed; a first holding command step for sending a pressure holding command to said pressure controlling means and maintaining the pressure within said wheel cylinder until the brake release condition is established when the brake holding condition is established and when the brake release condition is not established; and a pressure decrease command step for sending a pressure to thereby decrease the pressure within said wheel cylinder decrease command to said pressure controlling means and releasing the brake when the brake release condition is established.

In a preferred form of the invention, the system, further comprising: a wheel cylinder pressure detector for detecting the pressure within said wheel cylinder and a pressure increase means controlled by said controller for increasing the pressure within said wheel cylinder independently of the operation of the brake pedal. The controller, for controlling the pressure within said wheel cylinder, further performs: a target pressure setting step for setting a target pressure needed within said wheel cylinder to obtain a target braking force; a comparative determination step for comparatively determining a detected pressure of said wheel cylinder pressure detector with the target pressure; and a second holding command step for, when the brake holding operation by said pressure controlling means is established and when the brake release condition is not established, performing said first holding command step when the detected pressure is higher than the target pressure and for increasing the pressure within said wheel cylinder up to the target pressure by said pressure increasing means, and at the same time, maintaining the pressure within said wheel cylinder until the brake release condition is established.

In a further preferred form of the invention, the system, further comprising: a braking force detecting means for detecting the braking force, wherein the brake holding condition is established at least when the brake pedal is depressed, and when the vehicle is at a standstill, and when a braking force equal to or greater than a predetermined value continues for a predetermined period of time.

In a still further preferred form of the invention, the brake holding condition is established at least when the brake pedal is depressed, and when the edition that the vehicle is stopped is continued for a predetermined period of time.

In accordance with a still further aspect of the invention, said second holding command step comprises a step for maintaining or increasing the pressure within said wheel cylinder by virtue of said pressure increasing means to thereby maintaining the pressure within said wheel cylinder at the target pressure when the brake pedal is first released after the brake holding condition has been established.

In accordance with a yet further aspect of the invention, said target pressure setting step comprises a step for setting the pressure within said wheel cylinder as the target pressure when the brake holding condition is established.

In a further preferred form of the invention, said target pressure setting step comprises a step for setting a pressure as the target pressure based upon the pressure within said wheel cylinder when the brake holding condition is established.

In a further preferred form of the invention, said target pressure setting step comprises a step for setting the target pressure obtained by adding a predetermined value to the pressure within said wheel cylinder when the brake holding condition is established.

In a further preferred form of the invention, the system, further comprising: a selection switch for allowing a driver to select operation/non-operation of said grade-holding brake system, wherein the brake release condition is established even if the selection switch is in a non-operating condition.

In a further preferred form of the invention, said controller further performs a shift range detecting step for detecting a shift range selected by a driver in a vehicle provided with an automatic transmission, wherein the brake release condition may also be established when the shift range is in park.

In a further preferred form of the invention, said controller further performs a brake re-depress detecting step for detecting that the brake pedal has been depressed again when the first and/or second holding command step(s) are/is executed and the brake pedal is released, and the brake release condition is established even when the brake pedal is depressed again.

In a further preferred form of the invention, said pressure controlling means comprises a first cut-off valve disposed in a first brake tubing for connecting the master cylinder and the wheel cylinder to each other for opening/closing said first cut-off valve to hold or decrease the pressure within said wheel cylinder.

In a further preferred form of the invention, said pressure increase means comprises a pressure booster means disposed in parallel with said first brake tubing in a brake tubing for connecting said master cylinder and said wheel cylinder to each other, and a second cut-off valve disposed at least closer to said master cylinder at least than said Pressure booster means, wherein the pressure within said wheel cylinder is increased or held by using said pressure booster means and said second cut-off valve to thereby control the braking force.

In a further preferred form of the invention, one of said brake depressing amount detecting step and said brake re-depress detecting step is performed by a brake switch for outputting that the brake pedal is depressed to a predetermined depth.

In a further preferred form of the invention, one of said brake depressing amount detecting step and said brake re-depress detecting step is performed by a master cylinder pressure detector for detecting a pressure at a location closer to the master cylinder than said first cut-off valve.

In a further preferred form of the invention, said brake depressing amount detecting step is performed by a wheel cylinder pressure detector for detecting a pressure closer to the wheel cylinder than said first cut-off valve.

In a further preferred form of the invention, the system, further comprising an alarm for informing the driver of the operation/non-operation of said grade-holding brake system, wherein said controller further performs at least one of a holding alarm step for sounding said alarm when the brake holding condition is established and when the brake release condition is not established, and a release alarm step for sounding said alarm when the brake release condition is established.

In a further preferred form of the invention, the alarm sound of the holding alarm step is different from the alarm sound of the release alarm step.

In a further preferred form of the invention, the system, further comprising a lamp for informing the driver of the operation/non-operation of said grade-holding brake system, wherein said controller further performs a lighting step for lighting said lamp until the brake release condition is established when the brake holding condition is established and when the brake release condition is not established, and a turn-off step for turning said lamp off when the brake release condition is established.

In a further preferred form of the invention, the system, further comprising an announcing device for notifying the driver of the operation/non-operation of said grade-holding brake system to the driver, wherein said controller further performs one of an operation announcing step for announcing a message indicating the operation of said grade-holding brake system when the brake holding condition is established and when the brake release condition is not established, and a non-operation announcing step for announcing a message the non-operation of said grade-holding brake system when the brake release condition is established.

DESCRIPTION OF THE PREFERRED EMBODIMENTS

Preferred embodiments of the invention will now be described with reference to the accompanying drawings.
EMBODIMENT 1

Figure 1:
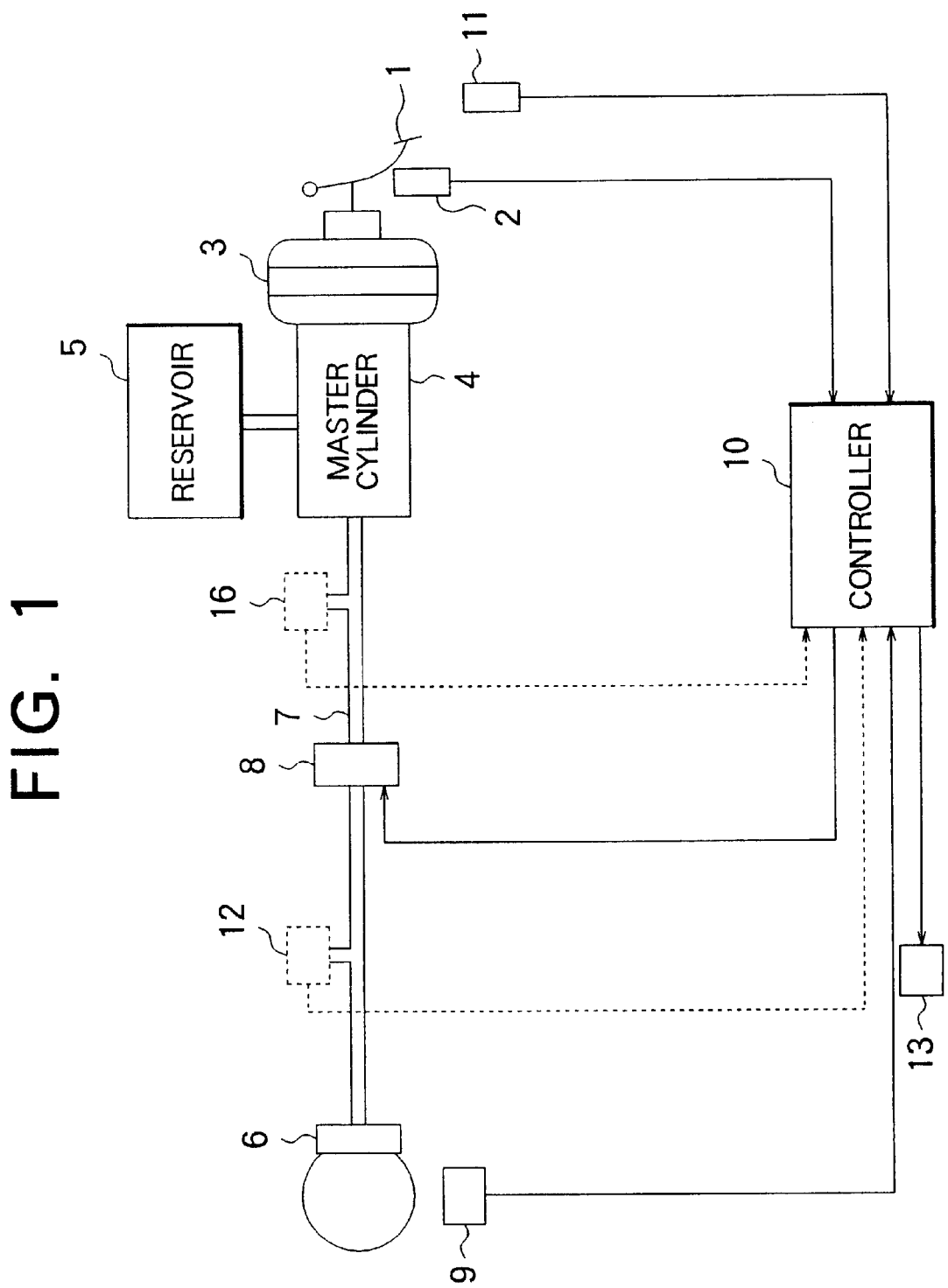
FIG. 1 is a schematic view showing a structure of a grade-holding brake system in accordance with a first embodiment of the present invention.

FIG. 1 is a schematic view showing a structure of a grade-holding brake system in accordance with a first embodiment of the present invention.

In FIG. 1, a master cylinder 4 is connected to a brake pedal 1 through a booster device 3 for feeding brake oil contained in a reservoir 5 to brake tubing 7 by operating the brake pedal 1. A wheel cylinder 6 is used to increase pressure of the brake oil so that a braking force may be applied to a wheel.

A cut-off valve 8 (first cut-off valve) as pressure controlling means is provided in the brake tubing 7 for connecting an outlet port of the master cylinder 4 to the wheel cylinder 6. The cut-off valve 8 is electrically connected to and opened and closed by a controller 10. However, the cutoff valve 8 is kept in an open condition unless a command is received.

A brake switch 2 detects that the brake pedal 1 has been depressed to a predetermined depth. An accelerator switch 11 detects that an accelerator pedal (not shown) has been depressed to a predetermined depth. A vehicle speed sensor 9 is used to detect the speed of the vehicle. A lamp 13 indicates the operating state of the grade-holding brake system to the driver.

The operation of the grade-holding brake system thus constructed will now be described.

When the brake pedal 1 is depressed, the pedal force at the time of braking is amplified by the booster device 3, and brake hydraulic pressure is generated in the master cylinder 4 by the amplified force. When the cut-off valve 8 is kept open by the controller 10, the brake hydraulic pressure within the master cylinder 4 is transmitted to each wheel cylinder 6 through the brake tubing 7 so that the braking force is applied to the wheels.

In this condition, the cut-off valve 8 is closed by the controller 10. Then, even if the brake pedal 1 is released, the brake hydraulic pressure within each wheel cylinder 6 and the braking force are maintained.

Next, when the accelerator pedal is depressed and the accelerator switch 11 is operated, the controller 10 opens the cut-off valve 8, and the pedal force of the brake pedal 1 is released so that the brake oil within the wheel cylinder 6 returns back to the reservoir 5 through the brake tubing 7. Hence the brake hydraulic pressure is reduced and the braking force is released.

Further, the operation of the controller 10 is performed by executing a program with a microcomputer or the like.

The content of the program executed by the controller 10 will now be described.

Figure 2:
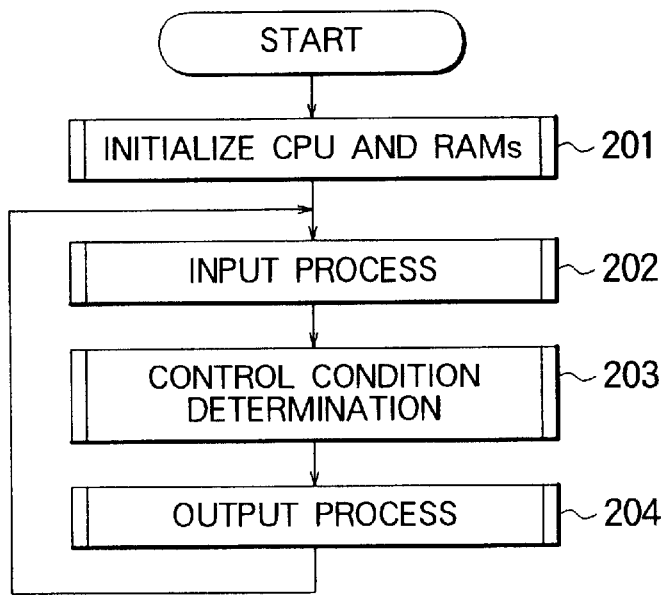
FIG. 2 is a flowchart showing a main routine of a control program of the grade-holding brake system according to the first embodiment of the present invention.

FIG. 2 is a flowchart showing a main routine of a control program of the grade-holding brake system in accordance with the first embodiment of the present invention. The control program represented by such a flowchart is repeatedly executed at predetermined periods, for example, every 20 ms.

Figure 3:
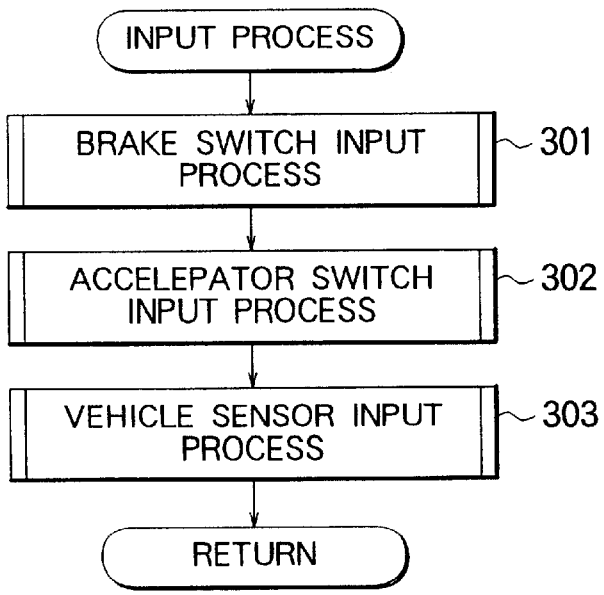
FIG. 3 is another flowchart showing a control program of the grade-holding brake system according to the first embodiment of the present invention.

FIG. 3 is a flowchart showing an input process of the control program for the grade-holding brake system according to the first embodiment of the present invention.

In this case, ZPreal and Ycntrl, described later, indicate RAMs for tentatively storing calculation results.

First, in step 201, the above-described RAMs are initialized.

The conditions of the sensors and switches connected to the controller 10 are input in step 202.

Specifically, the flow is shown in the input process of FIG. 3.

In step 301, the ON/OFF condition of the brake switch 2 is input, and it is determined whether or not the brake pedal 1 is depressed to or over a predetermined depth. In step 302, the ON/OFF condition of the accelerator switch 11 is input, and it is determined whether or not the accelerator pedal is depressed to or over a predetermined depth. In step 303, the vehicle speed signal output from the speed sensor 9 is input and converted into the vehicle speed.

The process from step 301 to step 303, as described above, is completed, and the flow advances to step 203 of FIG. 2.

Figure 4:
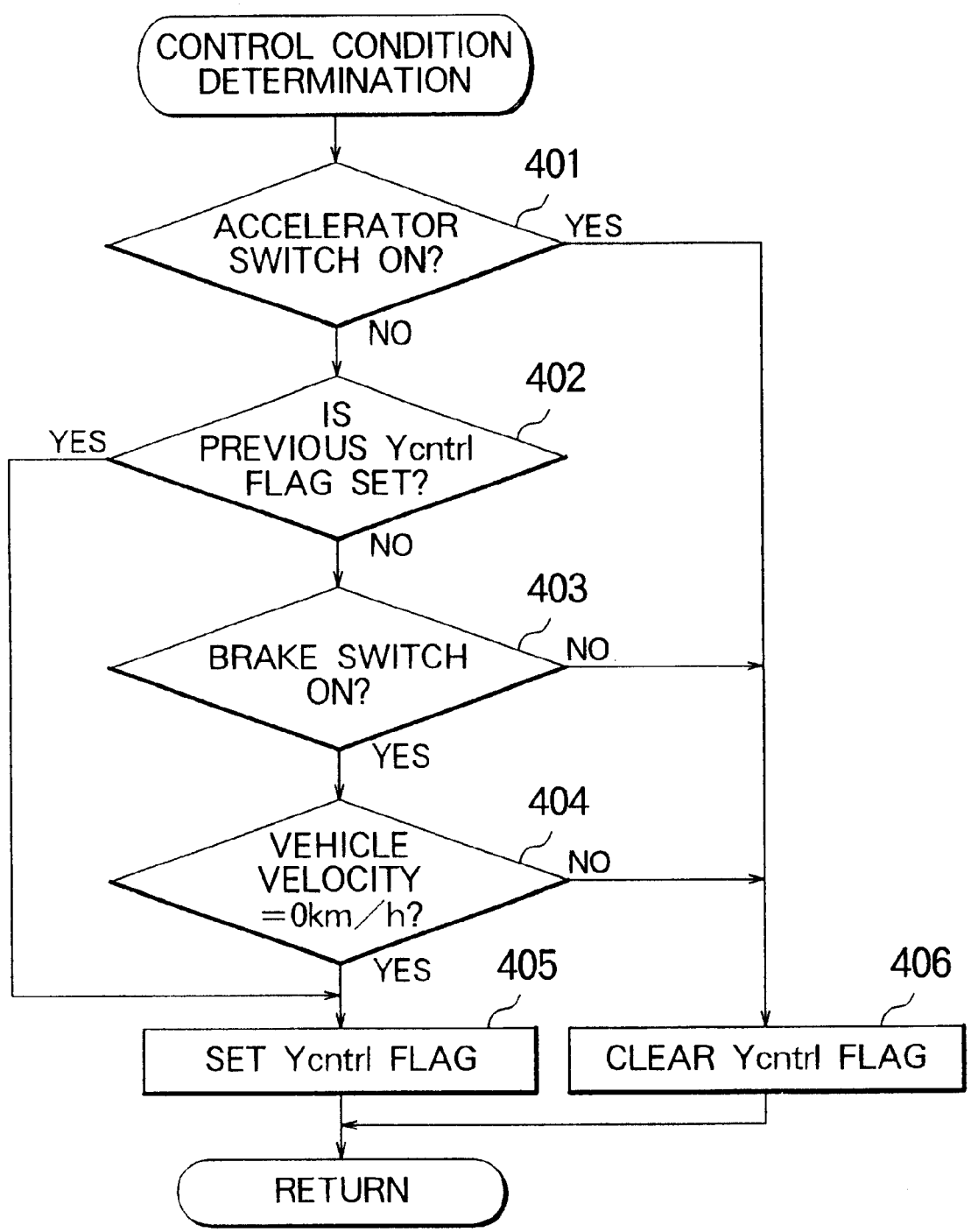
FIG. 4 is still another flowchart showing an input process of a control program of the grade-holding brake system according to the first embodiment of the present invention.

FIG. 4 is a flowchart showing an input process of a control program of the grade-holding brake system according to the first embodiment of the present invention.

As shown in FIG. 4, first, in step 401, an accelerator pedal depression detecting step, it is determined whether or not the accelerator switch 11 is in the ON condition (accelerator pedal depressed condition). If the accelerator pedal is depressed, the program advances to step 406 and the Ycntrl flag is cleared so that conditions for controlling the grade-holding brake system are not established. Also, if the accelerator pedal is not depressed, the program advances to step 402.

In step 402, it is determined whether or not the Ycntrl flag of the previous process is in a set condition. If it is in the set condition according to the determination of the previous process, the program advances to step 405 (a holding condition establishment step), and the Ycntrl flag is set in order to establish the controlling conditions for the grade-holding brake system. Also, when the set condition is not established according to the determination of the previous process, the program advances to step 403.

In step 403, a brake pedal depression detecting step, it is determined by whether or not the brake pedal 1 is depressed using the brake switch 2. Unless the brake pedal 1 is depressed, the program advances to step 406, a holding condition release step to clear the Ycntrl flag. Also, if the brake pedal 1 is depressed, the program advances to step 404.

In step 404, the stopped vehicle determination step, it is determined whether or not the speed of the vehicle is zero. Unless the speed of the vehicle is zero, the program advances to step 406 to clear the Ycntrl flag. Also, if the speed of the vehicle is zero, the program advances to step 405 to set the Ycntrl flag.

The process from step 401 to step 406, as described above, is completed, and the program advances to step 204 of FIG. 2.

Thus, when the brake pedal 1 is depressed so that the speed of the vehicle becomes zero, it is determined that the conditions for controlling the grade-holding brake system have been met. However, when the accelerator pedal is depressed in a state where the controlling conditions have been established, it is possible to disable the controlling conditions of the grade-holding brake system.

Further, step 404 is to determine the vehicle stopping condition based on whether the vehicle speed is zero or not. However, it is possible to determine the vehicle stopping condition of the vehicle based on whether or not the vehicle speed is smaller than a predetermined value.

Also, step 403 for determining whether or not the brake pedal is depressed by means of the brake switch 2 may be performed by means of a wheel cylinder pressure sensor 12 provided for detecting brake hydraulic pressure, (hereinafter referred to as wheel cylinder pressure) applied to the wheel cylinder 6 as indicated by dotted lines in FIG. 1, and comparing the wheel cylinder pressure with a predetermined value.

Further, a master cylinder pressure sensor 16 is provided as a braking force detecting means for detecting the braking force on the basis of the brake hydraulic pressure applied to the master cylinder 4 (hereinafter referred to as master cylinder pressure), and the step 403 may be a step for determining whether or not the brake pedal is depressed by comparing the pressure within the master cylinder 4 with a predetermined value.

Figure 5:
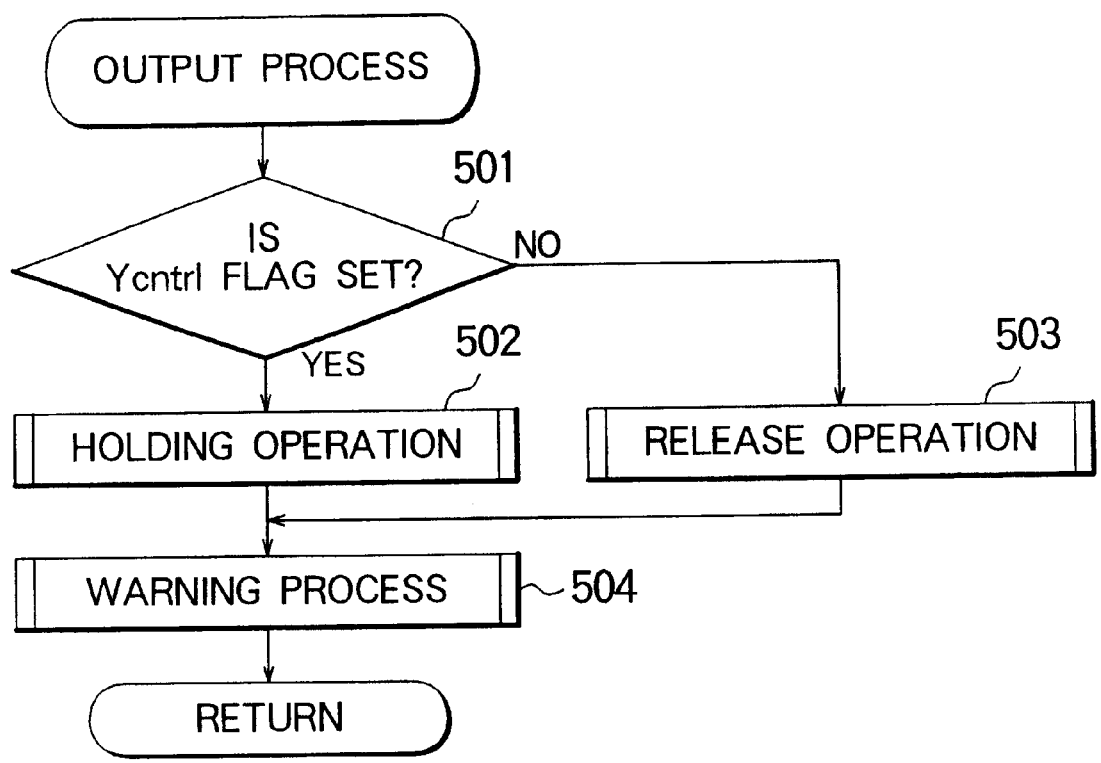
FIG. 5 is still another flowchart showing a portion of a control program of the grade-holding brake system according to the first embodiment of the present invention.
Figure 6A:
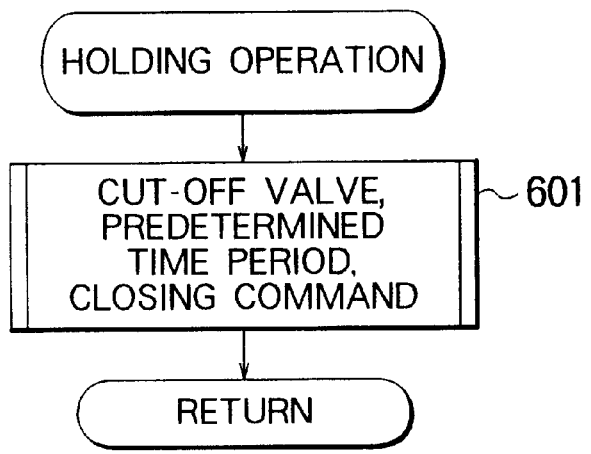
FIG. 6 is still another flowchart showing a portion of a control program of the grade-holding brake system according to the first embodiment of the present invention.
Figure 6B:
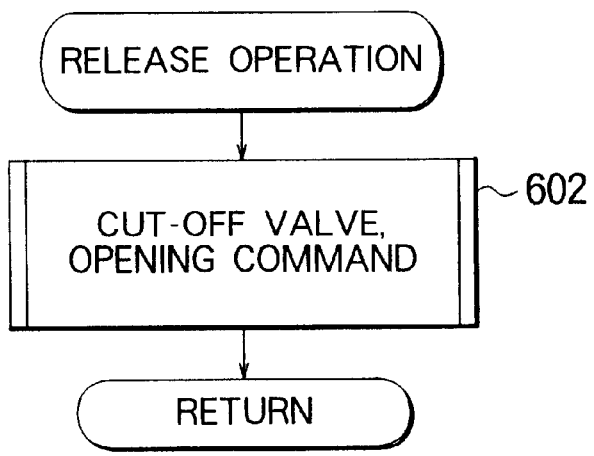
Figure 7:
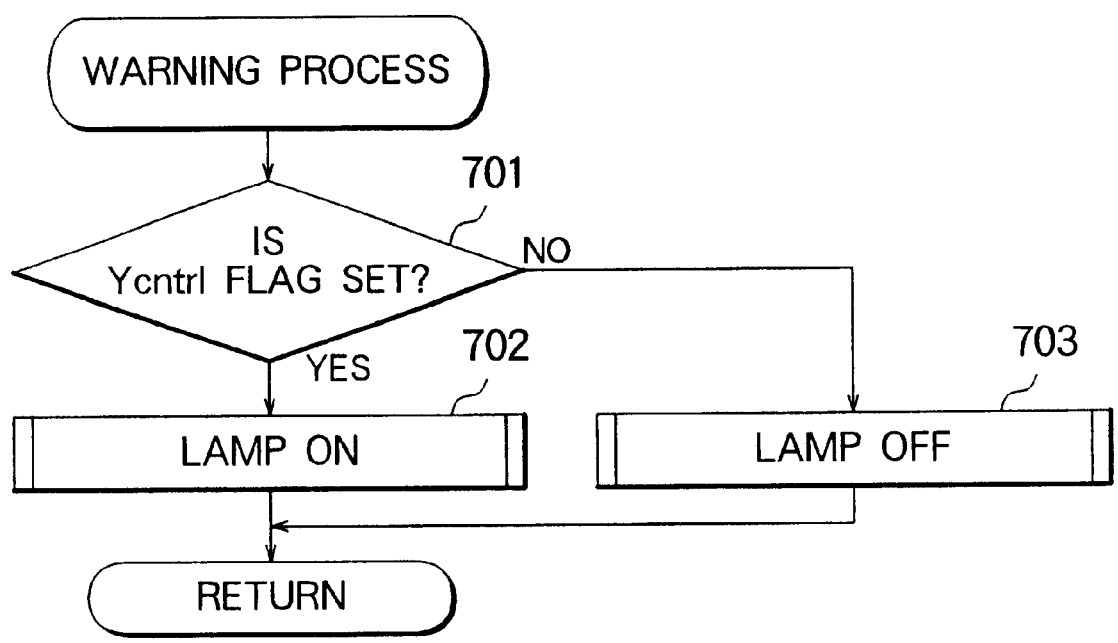
FIG. 7 is still another flowchart showing a portion of a control program of the grade-holding brake system according to the first embodiment of the present invention.

FIGS. 5, 6 and 7 are flowcharts showing a part of the control program of the grade-holding brake system according to the first embodiment of the present invention.

FIG. 5 shows a flow of the output process, and FIGS. 6 and 7 show the process contents of steps 502 and 503.

As shown in FIG. 5, in step 501, it is determined whether or not the Ycntrl flag obtained according to the above-described control condition determination is in the set condition. If it is in the set condition, the program flow advances to step 502 as a first holding command step.

In step 502, in order to maintain the brake hydraulic pressure within the wheel cylinder 6, the closed condition of the cut-off valve 8 is maintained. Unless the cut-off valve 8 receives a command from the controller 10, the cut-off valve 8 is kept in the open condition. As an example of a step for holding the cut-off valve 8, a step can be given for keeping the cut-off valve 8 in a closed condition for only a predetermined period of time, as in step 601 shown in FIG. 6A. If the predetermined period of time in step 601 is set to be at least equal to or more than the calculation cycle of the main routine, it is possible to keep the cut-off valve 8 in the closed condition during the period when the Ycntrl flag is in the set condition.

Also, in step 501, unless the Ycntrl flag is in the set condition, the flow advances to step 503 as a pressure decrease command step.

In step 503, in order to release the brake hydraulic pressure within the wheel cylinder 6, the cut-off valve 8 is operated for brake release. As an example of a release operation of the cut-off valve 8, a step can be given for sending a pressure decreasing command to the cut-off valve 8 and continuing the opened condition, as in step 602 shown in FIG. 6B. Further, it is possible to perform the release operation and the holding operation of the cut-off valve 8 by utilizing a timer interrupt function of the CPU rather than the above-described step.

In step 504, a warning process for informing the driver of the operating condition of the grade-holding brake system is executed. As an example of the warning process, a process flow as shown in the flowchart of FIG. 7 is given.

In step 701, it is determined whether or not the Ycntrl flag is in the set condition. If the Ycntrl flag is in the set condition, the lamp 13 is turned on in step 702 as a lighting step to thereby inform the driver of the operation of the grade-holding brake system. Also, if the Ycntrl flag is in the cleared condition, the lamp 13 is turned off in step 703 as a turn-off step to thereby inform the driver that the grade-holding brake system is not operating.

As described above, according to the grade-holding brake system according to the first embodiment of the present invention, when the brake pedal is depressed and the vehicle is stopped, the braking force is maintained. In addition, even if the brake pedal is released, the stopped condition of the vehicle is maintained. Accordingly, it is unnecessary to perform abrupt pedal changes from the brake pedal to the accelerator pedal, thereby allowing the vehicle to readily start off on a slope. Also, it is possible to dispense with the need to continuously depress the brake pedal while in a traffic jam or when waiting for a signal change. Thus, it is possible to reduce the fatigue caused by braking. Also, for example, if the brake release condition is established by depressing the accelerator pedal, since the braking force is released, it is possible to readily release the vehicle from the stopped vehicle condition without causing the driver to feel that the operation is troublesome.

Further, the grade-holding brake system according to the present invention may be applied to a grade-holding brake system, which is operated by something other than brake oil pressure.

EMBODIMENT 2

Figure 8:
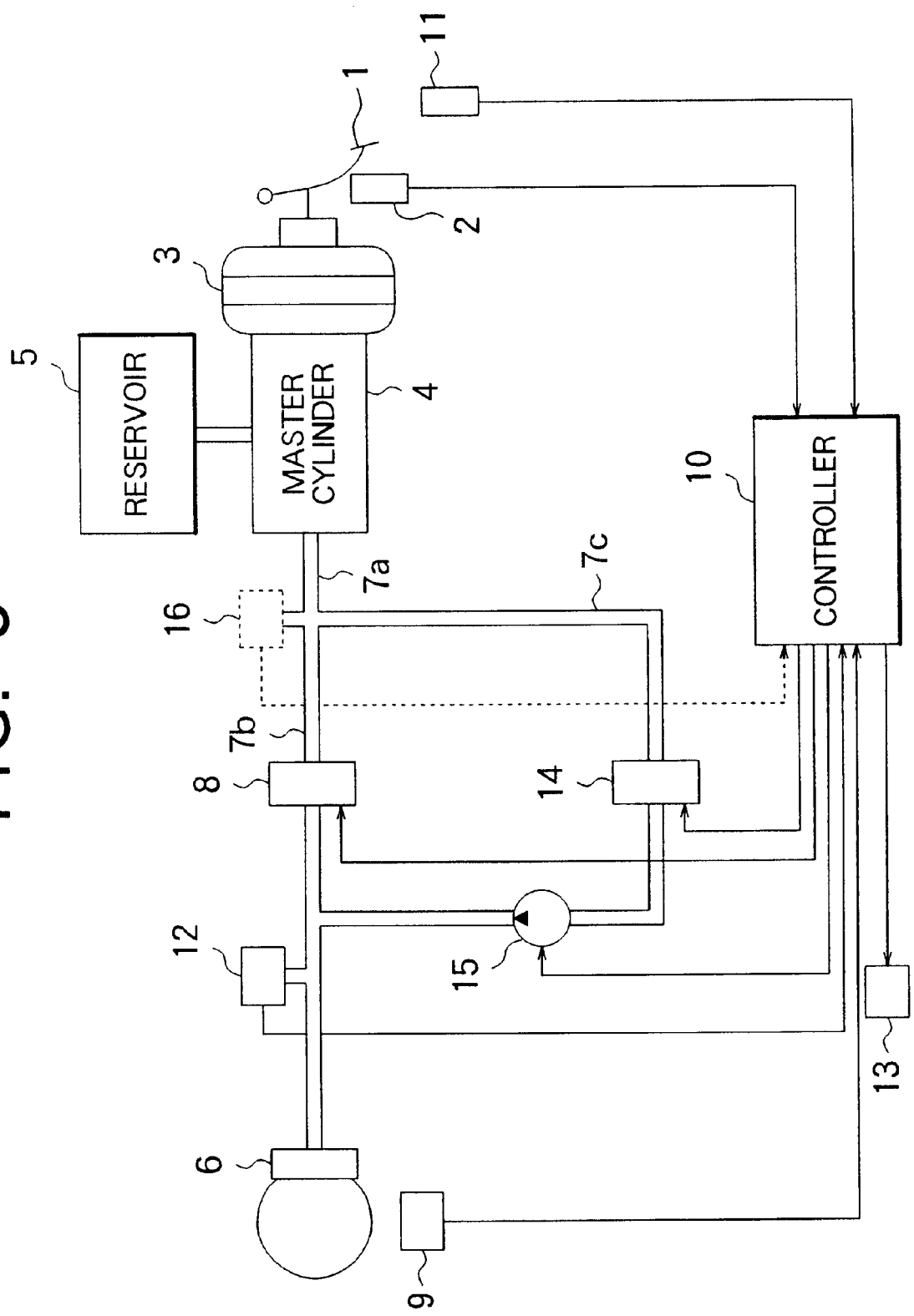
FIG. 8 is a schematic view showing a structure of a grade-holding brake system in accordance with a second embodiment of the present invention.

FIG. 8 is a schematic view showing a structure of the grade-holding brake system according to a second embodiment of the present invention.

As shown in FIG. 8, a master cylinder 4 for feeding brake oil contained in a reservoir 5 to a brake tubing 7a by operating a brake pedal 1 is connected to the brake pedal 1 through a booster device 3. A wheel cylinder 6 is used to increase pressure of the brake oil so that a braking force may be applied to each wheel. The brake tubing 7a is connected to an outlet port of the master cylinder 4. This brake tubing 7a is branched into two branch tubings 7b and 7c.

The branch tubing 7b is connected to the wheel cylinder 6 through a cut-off valve 8. The branch tubing 7c is connected to the wheel cylinder 6 through a pressure booster valve 14 and a pressure booster pump 15. Further, the cut-off valve 8 and the pressure booster valve 14 are electrically connected to a controller 10 and are opened and closed by the controller 10.

The cut-off valve 8 as a first cut-off valve maintains the open condition under the normal condition that it does not receive a pressure holding command. The pressure booster valve 14 as a second cut-off valve maintains the closed condition under the normal condition that it does not receive a pressure decreasing command.

Further, a pressure increasing means is composed of the pressure booster valve 14 as the second cut-off valve and the pressure booster pump 14 as the pressure booster means.

A brake switch 2 is used to detect the fact that the brake pedal 1 has been depressed to a predetermined depth. An accelerator switch 11 is used to detect that the accelerator pedal has been depressed to a predetermined depth. A vehicle speed sensor 9 is used to detect the speed of the vehicle.

A wheel cylinder pressure sensor 12 is used to detect wheel cylinder pressure applied to the wheel cylinder 6. A lamp 13 is used to show the driver the operating condition of the grade-holding brake system.

The operation of the grade-holding brake system constructed as shown in FIG. 8 will now be described in brief.

When the brake pedal 1 is depressed, the pedal force is amplified by the booster device 3 so that hydraulic pressure is generated in the master cylinder 4 by the amplified force. The cut-off valve 8 is kept in the open condition by the controller 10. When the pressure booster valve 14 is kept in the closed condition, the brake hydraulic pressure within the master cylinder 4 is transmitted to the wheel cylinder 6 through the branch tubing 7b to thereby apply a braking force to the wheels.

When the cut-off valve 8 is switched from the above condition to the closed condition by the controller 10 and the pressure booster valve 14 is switched to the open condition, the pressure booster pump 15 is driven until the wheel cylinder pressure becomes a target wheel cylinder pressure set by the controller 10, and the brake oil within the reservoir 5 is fed to the wheel cylinder 6 through the branched tubing 7c.

When the wheel cylinder pressure detected by the wheel cylinder pressure sensor 12 is equal to the target wheel cylinder pressure, the driving of the pressure booster pump 15 is stopped and the pressure booster valve 14 is closed by the controller 10. As a result, it is possible to maintain the desired braking force even if the brake pedal is released. Also, when the accelerator pedal is depressed to operate the accelerator switch 11 while the brake hydraulic pressure within the wheel cylinder 6 is being maintained and the controller 10 changes the cut-off valve 8 to the open condition, the brake oil within the wheel cylinder 6 returns back to the reservoir 5 through the branch tubings 7b and 7ad the master cylinder 4, to thereby reduce the brake hydraulic pressure and release the braking force.

Figure 9:
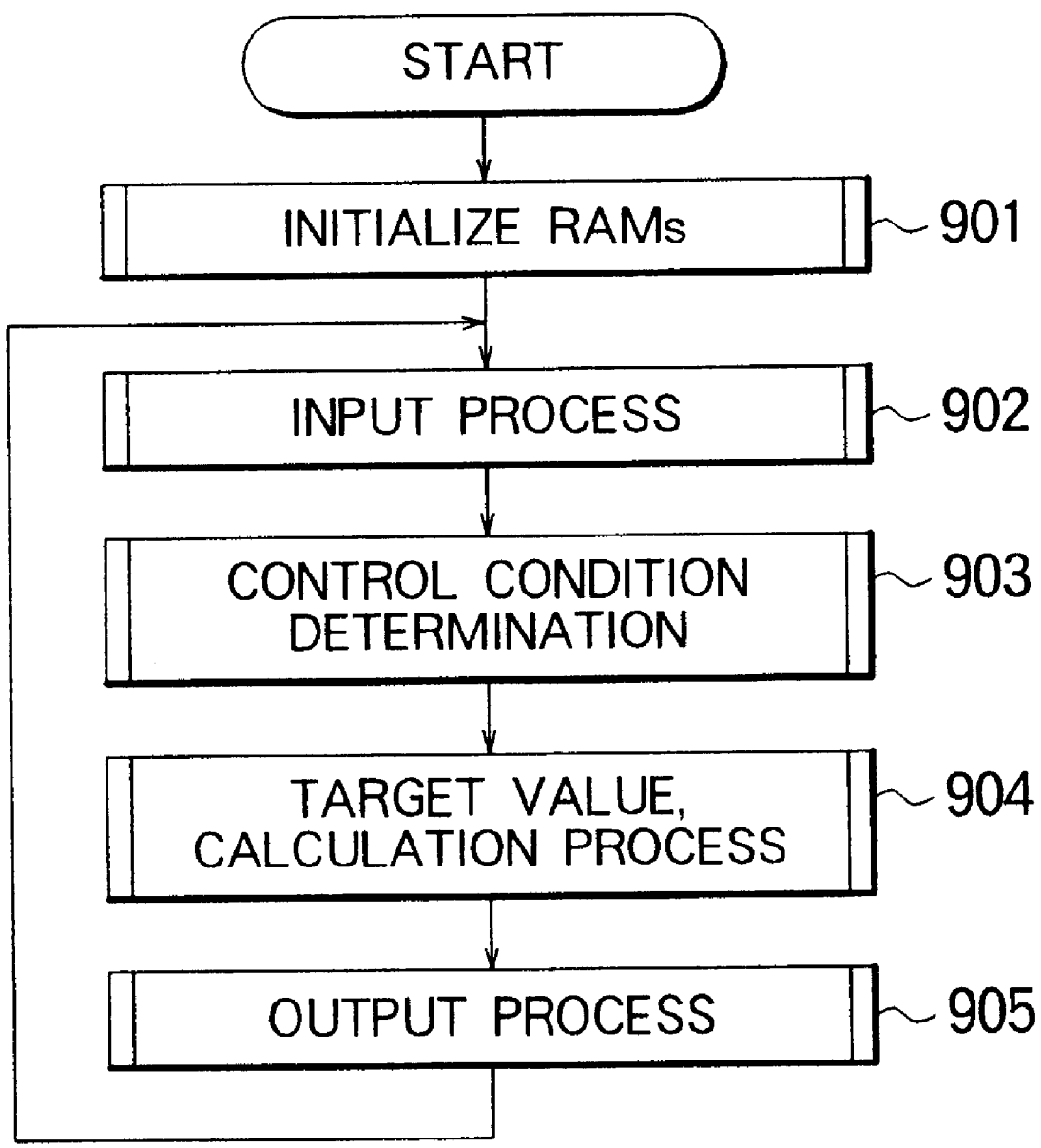
FIG. 9 is a flowchart showing a main routine of a control program of the grade-holding brake system according to the second embodiment of the present invention.

FIG. 9 is a flowchart showing a main routine of the control program of the grade-holding brake system in accordance with the second embodiment of the present invention. The main routine shown in FIG. 9 is repeatedly executed at predetermined periods, for example, every 20 ms.

Figure 10:
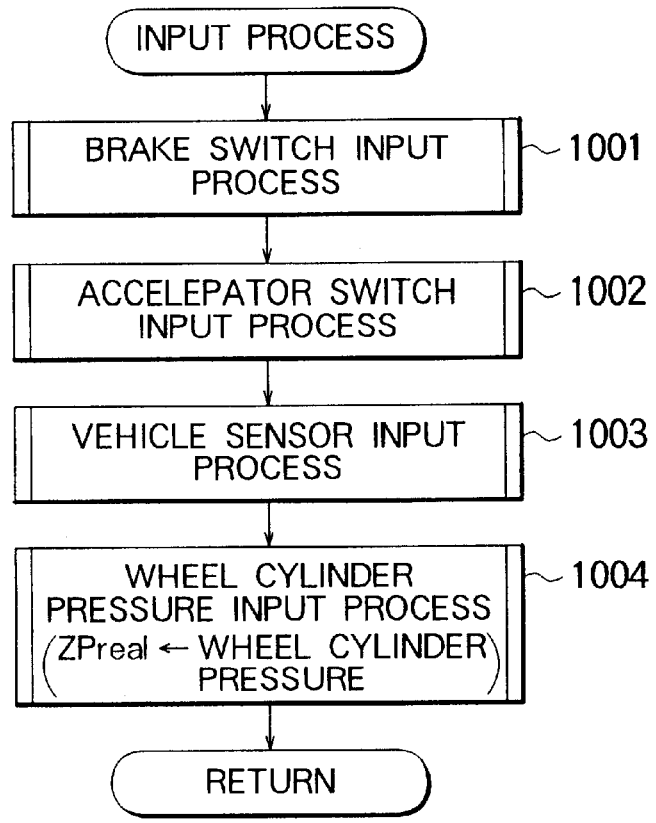
FIG. 10 is a flowchart showing a portion of the control program of the grade-holding brake system according to the second embodiment of the present invention.
Figure 11:
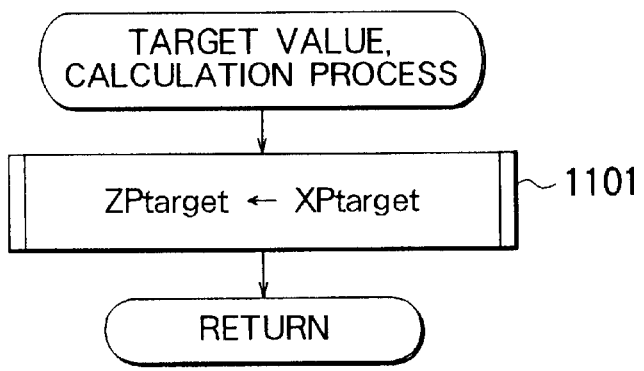
FIG. 11 is another flowchart showing a portion of the control program of the grade-holding brake system according to the second embodiment of the present invention.

FIGS. 10 and 11 are flowcharts showing a portion of the control program of the grade-holding brake system in accordance with the second embodiment of the present invention.

Here, ZPreal, ZPtarget, ZdP and Ycntrl, to be described later, are RAMs for temporarily storing the calculation results. Also, XPtarget and XdP are data stored in the ROM before the program is executed.

First, in step 901 shown in FIG. 9, the values of the RAMs are initialized.

In step 902, the conditions of the sensors and switches connected to the controller 10 are input. More specifically, step 902 is the flow of the input process shown in FIG. 10.

In step 1001 in FIG. 10, the ON/OFF condition of the brake switch 2 is input, and it is determined whether or not the brake pedal 1 is depressed. In step 1002 as an accelerator depressing detecting step, the ON/OFF condition of the accelerator switch 11 is input and it is determined whether or not the accelerator pedal is depressed.

In step 1003, the vehicle speed signal output from the vehicle sensor 9 is input, and is converted into the vehicle speed.

In step 1004, the wheel cylinder pressure detected by the wheel cylinder pressure sensor is substituted for ZPreal.

When the process from step 1001 to step 1003 is completed, the flow advances to step 903 shown in FIG. 9.

In step 903, a control condition determination like that shown in FIG. 4 according to the first embodiment is made. When the flow series shown in FIG. 4 is completed, the flow advances to step 904.

In step 904 as a target pressure setting step, the target wheel cylinder pressure is calculated. More specifically, a process like that shown in FIG. 11 is performed.

In step 1101 shown in FIG. 11, XPtarget as the predetermined target pressure is substituted for the target wheel cylinder pressure ZPtarget. It is preferable that the XPtarget has a value sufficient to keep the stopping condition of the vehicle.

The flow advances to step 905 after the above-described target value calculation process has been executed.

Figure 12:
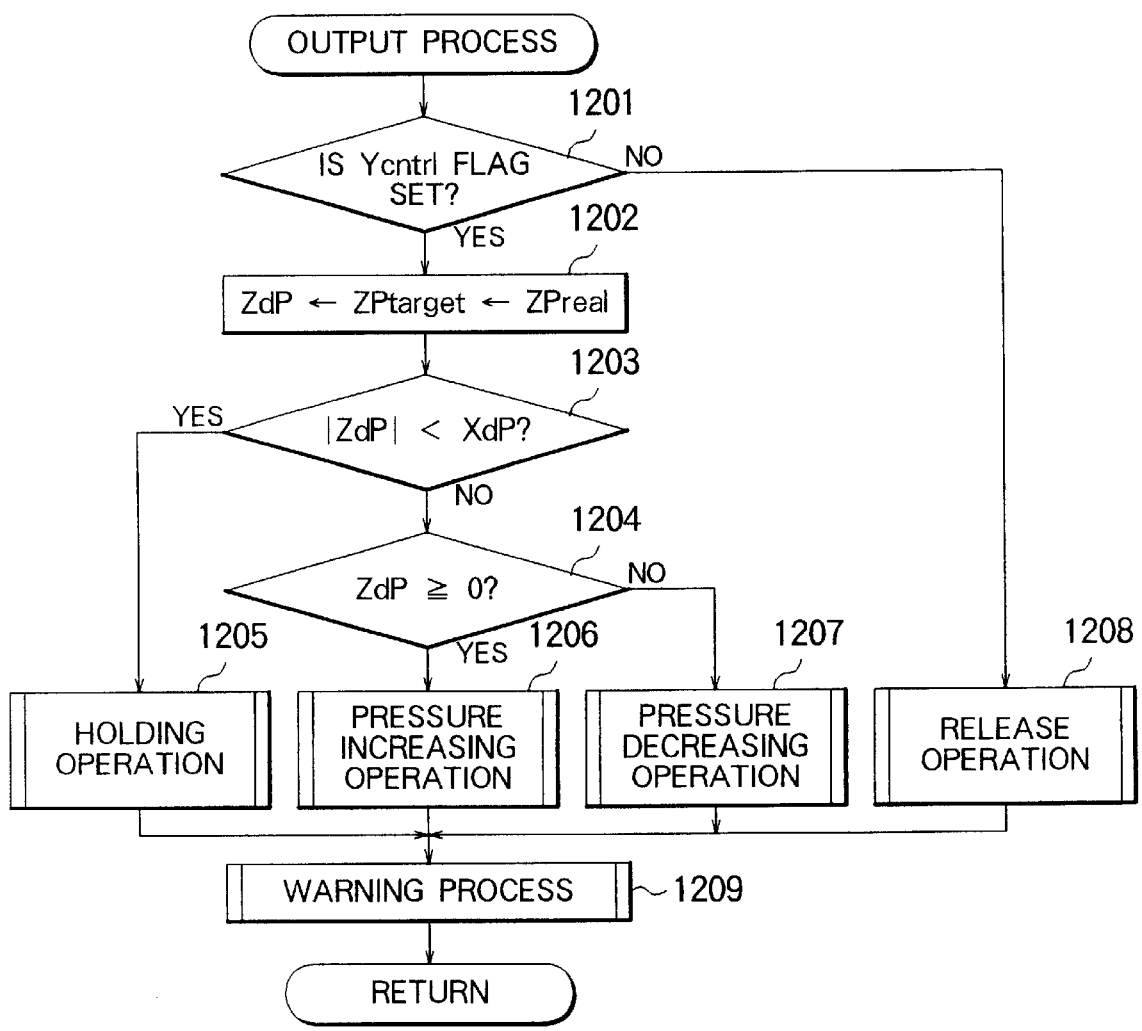
FIG. 12 is still another flowchart showing a portion of the control program of the grade-holding brake system according to the second embodiment of the present invention.

FIG. 12 is a flowchart showing a portion of the control program of the grade-holding brake system according to the second embodiment of the present invention.

In step 1201 in FIG. 12, it is determined whether or not the Ycntrl flag obtained in accordance with the control condition determination is in the set condition. If the Ycntrl flag is in the set condition, the flow advances to step 1202 for calculating the pressure deviation ZdP between the target wheel cylinder pressure Ptarget and the current wheel cylinder pressure ZPreal.

In step 1203 as a comparison determination step, it is determined whether or not the absolute value |ZdP| of the pressure deviation ZdP is smaller than the predetermined non-sensitive zone XdP, i.e., whether or not |ZdP|<XdP is established.

If the relationship |ZdP|<XdP is established, the flow advances to step 1205 as a first holding command step to perform the holding operation of the cut-off valve 8.

FIG. 13A, FIG. 13B, FIG. 13C, and FIG. 13D are flowcharts showing portions of the control program of the grade-holding brake system in accordance with the second embodiment of the present invention.

The holding operation in step 1205, first, for example gives a command to the cut-off valve 8 to hold the closed condition for a predetermined period of time in step 1301. If the predetermined period of time is set, at least, at a value equal to or longer than the calculation cycle of the main routine, it is possible to keep the cut-off valve 8 in the closed condition while the Ycntrl flag is in the set condition.

Also, in step 1302, the closed condition command is sent to the pressure booster valve 14. The pressure booster valve 14 keeps the closed condition as long as the pressure decreasing command is not received from the controller 10, the pressure booster valve 14 can continue the closed condition by only receiving the closed condition command.

The OFF command is given to the pressure booster pump 15 in step 1303.

Also, unless the relationship |ZdP|<XdP is established in step 1203 of FIG. 12, the flow advances to step 1204 and it is determined whether or not the pressure deviation ZdP is equal to or greater than zero.

Figure 13A:
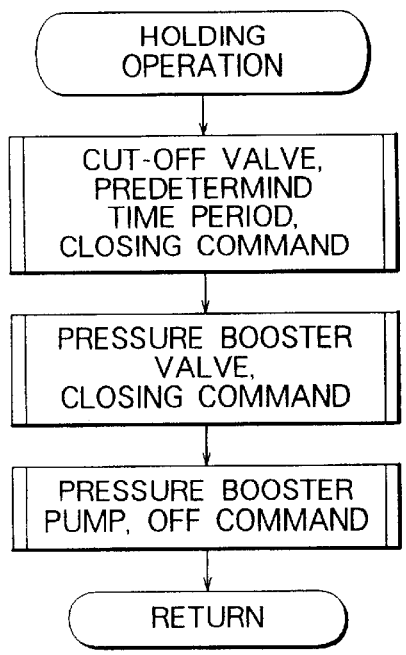
FIG. 13 is still another flowchart showing a portion of the control program of the grade-holding brake system according to the second embodiment of the present invention.
Figure 13B:
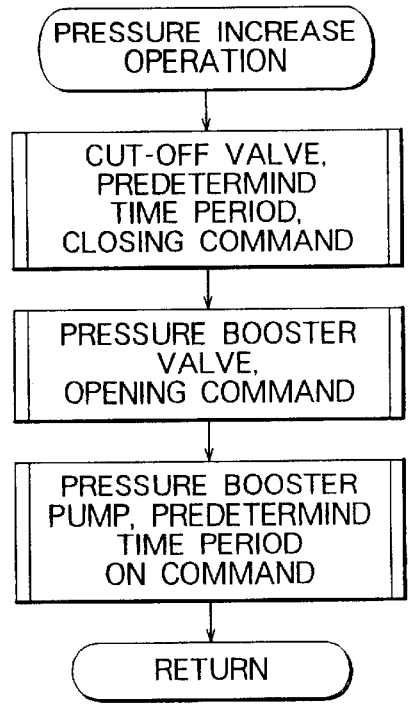

As a result, if the relationship ZdP≧0, is established, the flow advances to step 1206 to perform the pressure increasing operation. As an example of the pressure increasing operation, step 1304 as shown in the flowchart of FIG. 13B is given.

First, in step 1304, the command is given to the cut-off valve 8 to hold the closed condition for the predetermined period of time in the same way as in step 1301.

Subsequently, in step 1305, the command for holding the open condition for the predetermined period of time is sent to the pressure booster valve 14, and in step 1306, the command is given to hold the pressure booster pump 15 in the ON condition for a predetermined period of time. Further, steps 1304 and 1305 constitute a second holding command step.

Thus, if the predetermined periods of time for controlling the pressure booster valve 14 and the pressure booster pump 15 are set at values corresponding to the pressure deviation ZdP, it is possible to appropriately compensate for the pressure deviation.

Figure 13C:
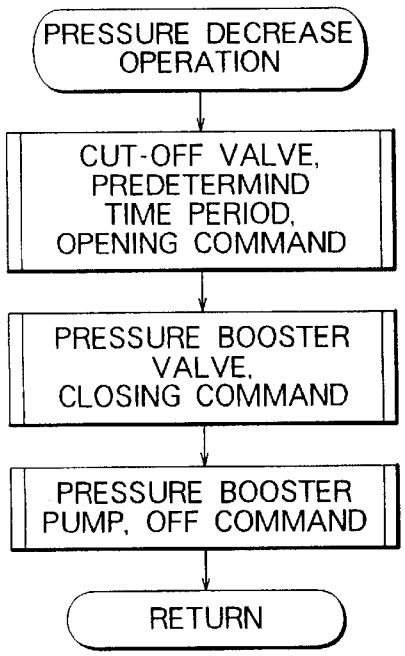

Also, in step 1204, unless the relationship, ZdP≧0 is established, the flow advances to step 1207 to thereby execute the pressure decreasing operation. As the pressure decreasing operation, step 1307 as shown in the flowchart of FIG. 13C is given.

First, in step 1307, a command is given to the cut-off valve 8 so that the closed condition is held for the predetermined period of time, after the open condition is held.

Also, in step 1308, the command for holding the closed condition is given to the pressure booster valve 14. In step 1309, the command for holding the OFF condition is sent to the pressure booster pump 15.

If the predetermined period of time for controlling the cut-off valve 8 is set at a value corresponding to the pressure deviation ZdP, it is possible to appropriately compensate for the pressure deviation.

In step 1201, unless the Ycntrl flag is in the set condition, the flow advances to step 1208 to execute the release operation to release the brake hydraulic pressure within the wheel cylinder 6.

Figure 13D:
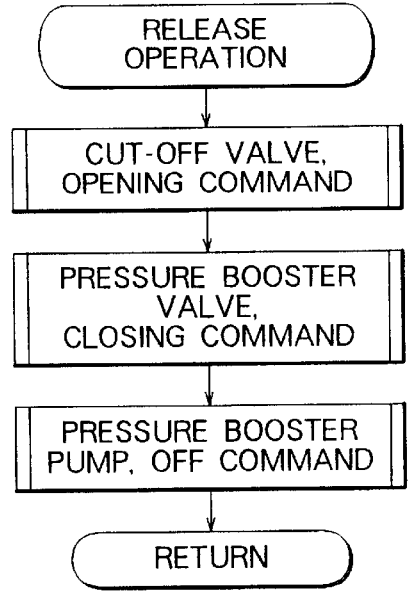

The steps as shown in FIG. 13D are given as an example of the release operation.

First, in step 1310, the command for holding the cut-off valve 8 in the open condition is given. Also, in step 1311, the command for holding the pressure booster valve 14 in the closed condition is given. In step 1312, the command for holding the pressure booster pump 15 in the OFF condition is given.

Further, it is possible to perform the pressure holding operation, the pressure increasing operation, the pressure decreasing operation and the pressure release operation using the cut-off valve 8, the pressure booster valve 14, and the pressure booster pump 15 by utilizing the timer interrupt function of the CPU rather than the above-described steps.

In step 1209, a warning process is executed for informing the driver of the operating condition of the grade-holding brake system. As the warning process, for example, the warning process in the first embodiment is executed (see FIG. 7).

As described above, according to the grade-holding brake system according to the second embodiment of the present invention, the pressure booster valve 14 and the pressure booster pump 15 are provided as a pressure increasing means for increasing the pressure within each wheel cylinder 6 when the brake pedal is depressed and the vehicle is stopped, and the pressure within each wheel cylinder 6 is set at a sufficient level to keep the vehicle stopped. Accordingly, it is possible to positively maintain the stopped condition of the vehicle even if the brake pedal is released. Also, when the predetermined brake release condition is established, for example, when the accelerator pedal is depressed, the braking force is released. Accordingly, the vehicle may be safely released from the vehicle stopping condition by a simple operation.

EMBODIMENT 3

Figure 14:
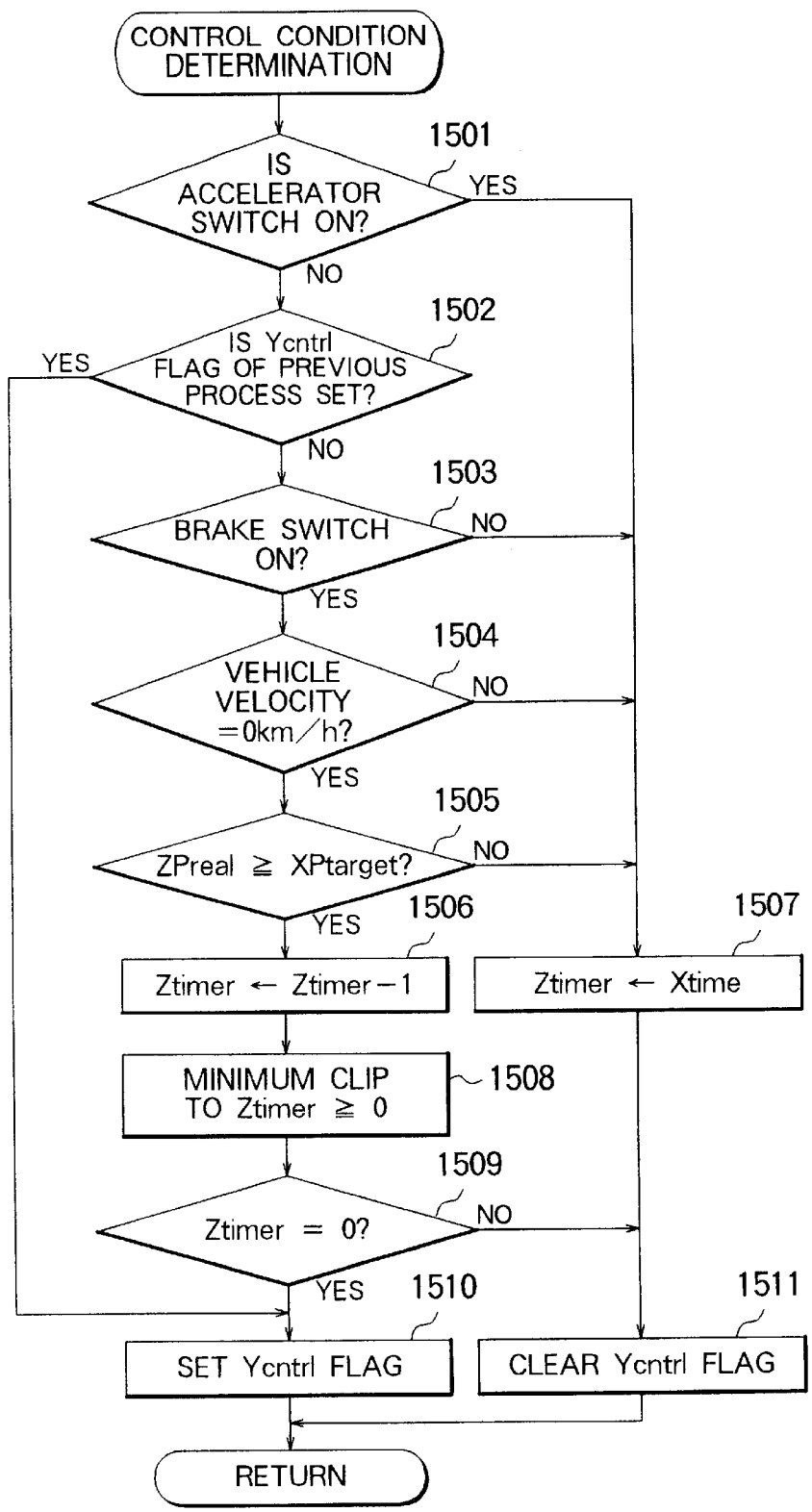
FIG. 14 is a flowchart showing a portion of the control program of the grade-holding brake system according to a third embodiment of the present invention.

FIG. 14 is a flowchart showing a portion of a control program for the grade-holding brake system according to a third embodiment of this invention.

The grade-holding brake system according to the third embodiment to change the control processing contents of step 202 (input process) and step 203 (control condition process) in the first embodiment (see FIG. 2).

Further, since the content of the input process according to the third embodiment is substantially the same as the process content (see FIG. 10) of the second embodiment, the explanation thereof will be omitted.

A flowchart of the control condition determination shown in FIG. 14 will now be described. Further, Ztimer, described later, is a RAM for temporarily storing the calculation result. Also, XPtarget and Xtime are data stored in the ROM before the execution of the program.

As shown in FIG. 14, first, in step 1501, it is determined whether or not the accelerator switch 11 is in the ON condition (accelerator pedal depressed condition).

If the accelerator pedal is depressed, the flow advances to step 1507, and the predetermined value Xtime is stored in the timer Ztimer. Thereafter, in step 1511 as a holding condition release step, the Ycntrl flag is cleared in order to disable the grade-holding brake system.

Also, if the accelerator pedal is depressed, the flow advances to step 1502. In step 1502, it is determined whether or not the Ycntrl flag of the previous process is in the set condition.

If the Ycntrl flag in the previous process is in the set condition, the flow advances to step 1510 as a holding condition establishment step. It is determined that the control condition of the grade-holding brake system is met, and the Ycntrl flag is set.

Also, unless the Ycntrl flag in the previous process is in the set condition, the flow advances to step 1503.

In step 1503 as a brake pedal depression detecting step, it is determined whether or not the brake pedal 1 is depressed.

As a result, unless the brake pedal 1 is depressed, the flow advances to step 1507. Also, if the brake pedal 1 is depressed, the flow advances to step 1504.

In step 1504 as a stopped vehicle determination step, it is determined whether or not the speed of the vehicle is zero.

As a result, unless the speed of the vehicle is zero, the flow advances to step 1507. Also, if the speed of the vehicle is zero, the flow advances to step 1505.

In step 1505 as a comparison determination step, it is determined whether or not the value of the wheel cylinder pressure ZPreal is equal to or greater than the value of the predetermined pressure XPtarget.

Unless the relationship, ZPtarget≧XPtarget, is established, the flow advances to step 1507, and the predetermined value Xtime is stored in the timer Ztimer. Thereafter, the Ycntrl flag is cleared in step 1511.

Also, in step 1505, if the relationship ZPtarget≧XPtarget is established, the flow advances to step 1506, and the Ztimer is decremented.

Further, in step 1508, the value of Ztimer is clipped so that the minimum value thereof is equal to or greater than zero. In step 1509, it is determined whether or not the timer Ztimer is zero. Unless the relationship Ztimer=0 is established, the flow advances to step 1511 and the Ycntrl flag is cleared.

Also, if the relationship, Ztimer=0 is established, the flow advances to step 1510 and the Ycntrl flag is set.

Thus, when the brake pedal 1 is depressed, if the wheel cylinder pressure ZPtarget is higher than the predetermined pressure XPtarget and the condition that the vehicle speed is zero has lapsed for a predetermined time period Xtime, it is determined that the control condition of the grade-holding brake system is established. If the accelerator pedal is depressed and the control condition has been established, it is possible to disable the control condition of the grade-holding brake system.

Further, in step 1504, it is determined whether the vehicle is in the vehicle stopping condition based on whether the vehicle speed is zero, but it is possible to modify this step so that it is determined whether the vehicle is in the vehicle stopping condition based on whether the vehicle speed is less than a predetermined value.

Also, in step 1503, it is determined whether or not the brake pedal is depressed by using the brake switch 2, but it is possible to modify this step so that, by comparing the wheel cylinder pressure with a predetermined value, it is determined whether or not the brake pedal is depressed.

Also, the master cylinder pressure sensor 16 may be provided as a braking force detecting means for detecting the braking force on the basis of the brake hydraulic pressure applied in the master cylinder 4 (hereinafter referred to as the master cylinder pressure), and as another modified step, whether or not the brake pedal is depressed may be determined by comparing the master cylinder pressure with a predetermined value.

As described above, in the grade-holding brake system according to the third embodiment of the present invention, when the brake pedal is depressed, the vehicle is in the vehicle stopping condition and the condition in which the braking force is equal to or greater than the predetermined value continues only for the predetermined time period, the braking force during this time is maintained. Accordingly, it is possible to maintain the pressure within the wheel cylinder such that there is at least enough braking force, adjusted by the driver, to keep the vehicle stopped, and it is possible to positively keep the vehicle stopped.

Also, when the vehicle is stopped for a short while by operation of the brake pedal, the grade-holding brake system is not operated, and on the other hand, when the vehicle is stopped for a long time, the grade-holding brake system is operated. Accordingly, in traffic jams, in which the vehicle is repeatedly started off and stopped, it is possible to move the vehicle while appropriately selecting the operation/non-operation of the grade-holding brake system.

EMBODIMENT 4

Figure 15:
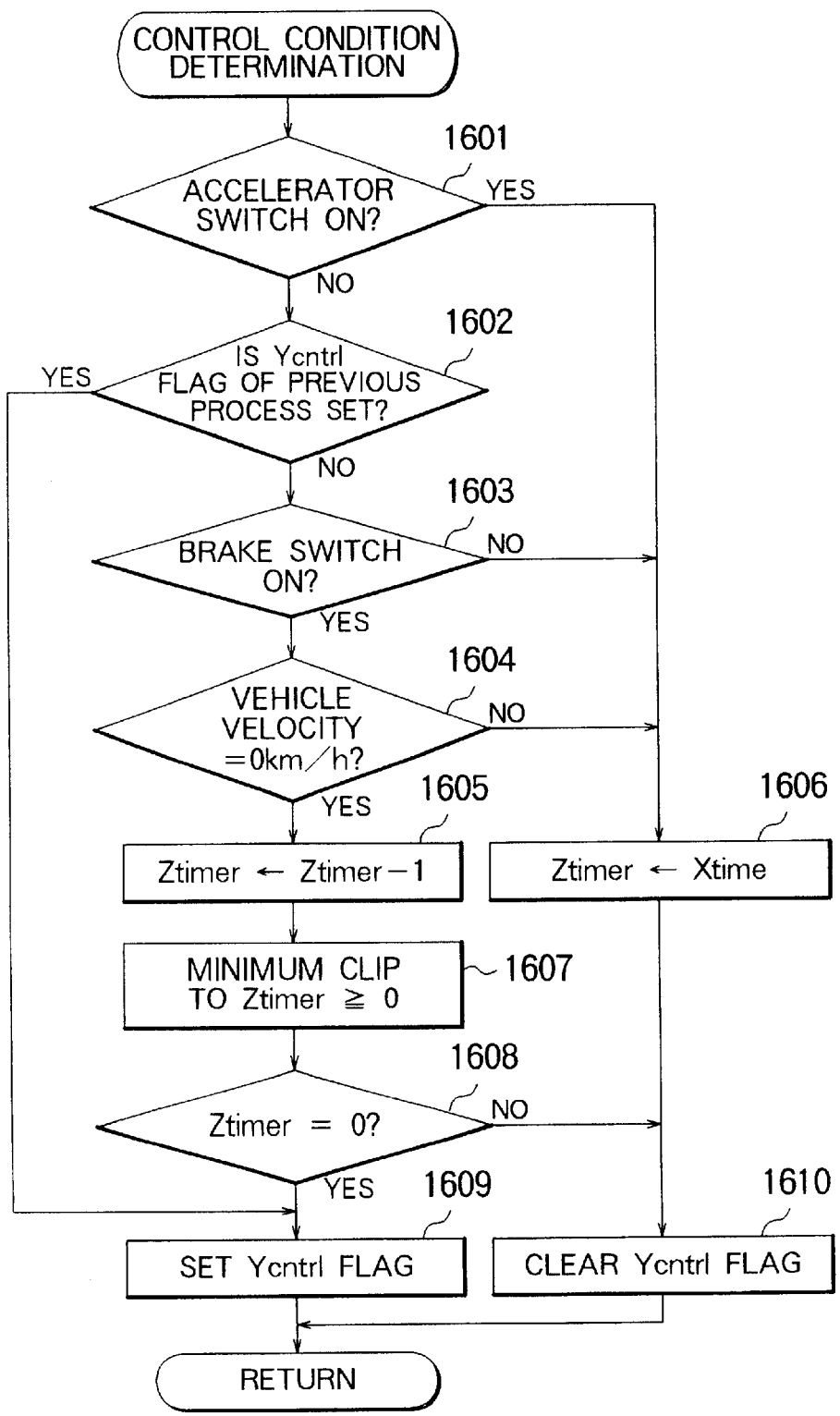
FIG. 15 is a flowchart showing a portion of the control program of the grade-holding brake system according to a fourth embodiment of the present invention.

FIG. 15 is a flowchart showing a portion of a control program for the grade-holding brake system according to a fourth embodiment of the present invention.

The grade-holding brake system according to the fourth embodiment is the assembly based on the first embodiment in which the wheel cylinder pressure sensor 12 is provided for detecting the wheel cylinder pressure applied to the wheel cylinder 6 and the input process of step 202 and the control condition determination process of step 203 explained in conjunction with the first embodiment are modified.

Also, the control condition determination process of step 903 explained in conjunction with the second embodiment is modified in comparison with the second embodiment.

Further, since the content of the input process according to the fourth embodiment is substantially the same as the process content (see FIG. 10) of the second embodiment, the explanation thereof will be omitted.

A flowchart of the control condition determination shown in FIG. 15 will now be described. Moreover, Ztimer, described later, is a RAM for temporarily storing the calculation result.

Also, Xtime is data stored in the ROM before the execution of the program.

First, in step 1601, it is determined whether or not the accelerator switch 11 is in the ON condition (depressed condition). If the accelerator pedal is depressed, the flow advances to step 1606, and the predetermined value Xtime is stored in the timer Ztimer. In step 1610, the Ycntrl flag is cleared in order to disable the control condition of the grade-holding brake system.

Also, if the accelerator pedal is depressed, the flow advances to step 1602. In step 1602, it is determined whether or not the Ycntrl flag of the previous process has been in the set condition.

If the Ycntrl flag in the previous process is in the set condition, the flow advances to step 1609, and the Ycntrl flag is set in order to establish the control condition of the grade-holding brake system. Also, unless the Ycntrl flag in the previous process is in the set condition, the flow advances to step 1603.

In step 1603, it is determined whether or not the brake pedal 1 is depressed.

As a result, unless the brake pedal 1 is depressed, the flow advances to step 1606. Also, if the brake pedal 1 is depressed, the flow advances to step 1604. In step 1604, it is determined whether or not the speed of the vehicle is zero.

In step 1604, if it is determined that the speed of the vehicle is not zero, the flow advances to step 1606. Also, if it is determined that the speed of the vehicle is zero, the flow advances to step 1605.

In step 1605, the Ztimer is decremented. Further, the value of Ztimer is clipped so that its minimum value is equal to or greater than zero in step 1607.

In step 1608, it is determined whether or not the timer Ztimer is zero. Unless the relationship, Ztimer=0 is established, the flow advances to step 1610 and the Ycntrl flag is cleared. Also, if the relationship Ztimer=0 is established, the flow advances to step 1610 and the Ycntrl flag is set.

Thus, when the brake pedal 1 is depressed and the condition that the vehicle speed is zero has lapsed for a predetermined time period Xtime, the control condition of the grade-holding brake system is established. If the accelerator pedal is depressed when the control condition is established, it is possible to disable the grade-holding brake system.

Further, in step 1604, it is determined whether or not the vehicle is in the vehicle stopping condition based on whether or not the vehicle speed is zero, but it is possible to modify this step so that it is determined whether the vehicle is under the vehicle stopping condition based on whether or not the vehicle speed is equal to or less than a predetermined value.

Also, in step 1603, by using the brake switch 2, it is determined whether the brake pedal is depressed, but it is possible to modify this step so that, it is determined by comparing the wheel cylinder pressure with a predetermined value.

Also, the master cylinder pressure sensor 16 is provided as a braking force detecting means for detecting the braking force on the basis of the master cylinder pressure, and, as another modified step, whether or not the brake pedal is depressed may be determined by comparing the master cylinder pressure with the predetermined value.

As described above, in the grade-holding brake system according to the fourth embodiment of the present invention, when the brake pedal is depressed and the condition that the vehicle is stopped continues for the predetermined time period, the braking force is maintained by first and second brake drivers. Accordingly, when the vehicle is stopped for only a short time by operation of the brake pedal, the grade-holding brake system is not operated, and when the vehicle is stopped for a long time, the grade-holding brake system is operated. Accordingly, in traffic jams in which vehicle is repeatedly started and stopped, it is possible to move the vehicle while appropriately selecting the operation/non-operation of the grade-holding brake system.

EMBODIMENT 5

Figure 16:
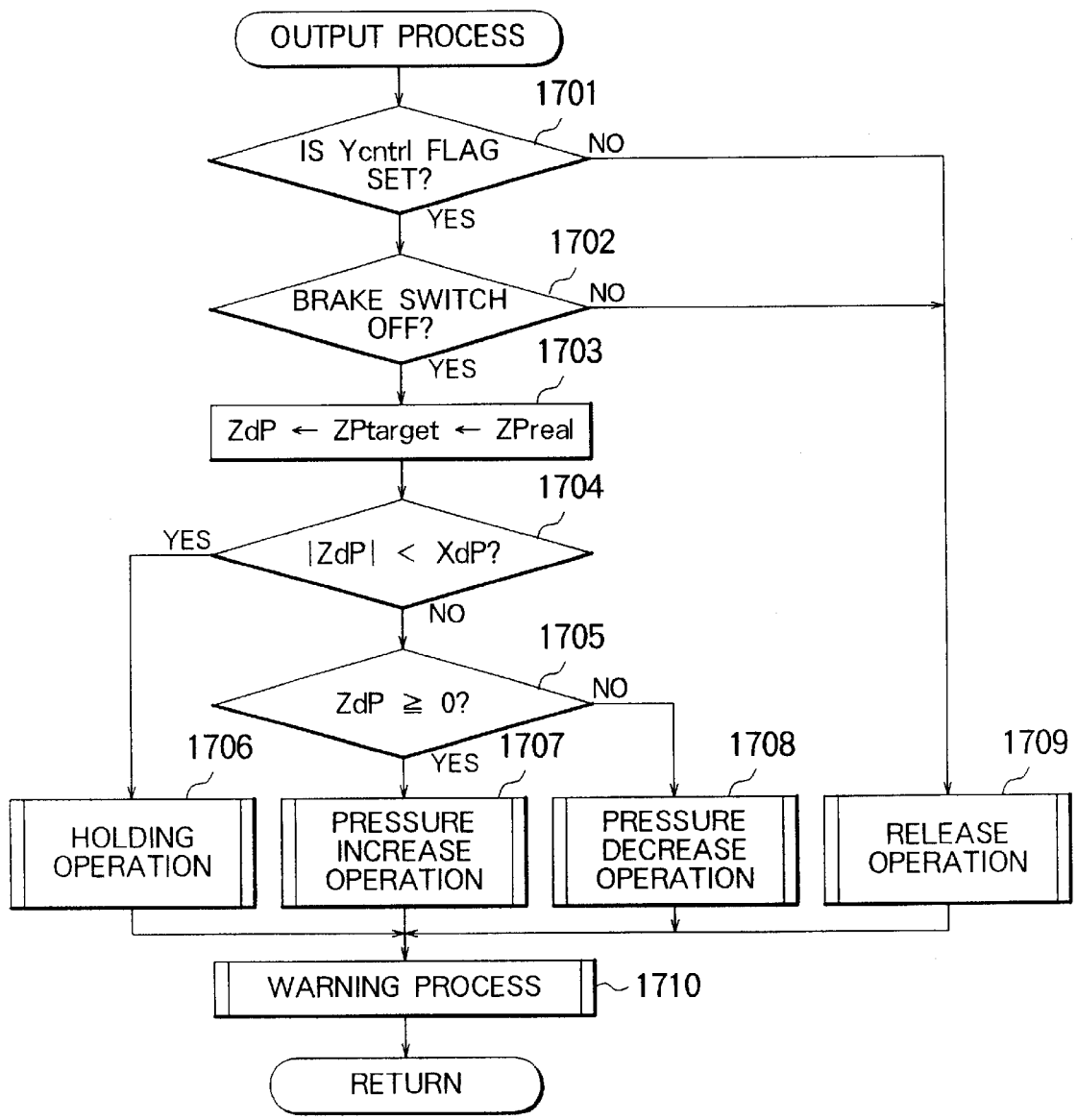
FIG. 16 is a flowchart showing a portion of the control program of the grade-holding brake system according to a fifth embodiment of the present invention.

FIG. 16 is a flowchart showing a portion of a control program for the grade-holding brake system according to a fifth embodiment of the present invention.

The grade-holding brake system according to the fifth embodiment is the assembly based on the second embodiment in which the content of the output process of FIG. 12, explained in conjunction with the second embodiment, is changed to the flowchart shown in FIG. 16.

The flowchart of the output process shown in FIG. 16 will now be described.

In step 1701, it is determined whether or not the Ycntrl flag obtained in accordance with the condition determination is in the set condition. If the Ycntrl flag is in the set condition, the flow advances to step 1702 for determining whether or not the brake switch 2 is in the OFF condition (the brake pedal is released).

Unless the brake switch 2 is in the OFF condition, the flow advances to step 1709 in order to bring the grade-holding brake system into the non-operating condition and the release operation is performed. If the brake switch 2 is in the OFF condition the flow advances to step 1703 to calculate the pressure deviation ZdP between the target wheel cylinder pressure ZPtarget and the current wheel cylinder pressure ZPreal.

In step 1704, it is determined whether or not the absolute value |ZdP| of the pressure deviation ZdP is smaller than the predetermined non-sensitive zone XdP, i.e., whether or not |ZdP|<XdP is established.

If the relationship |ZdP|<XdP is established, the flow advances to step 1706 to perform the holding operation. As the holding operation, the operation represented by the steps as shown in the flowchart of FIG. 13A explained in conjunction with the second embodiment can be given.

If the relationship |ZdP|<XdP is established in step 1704, the flow advances to step 1705 to determine whether or not the pressure deviation ZdP is equal to or greater than zero.

In step 1705, if the relationship ZdP≧0 is established, the flow advances to step 1707 to perform the pressure increase operation. As an example of the pressure increasing operation, the step as shown in the flowchart of FIG. 13B explained in conjunction with the second embodiment can be given.

Also, in step 1705, unless the relationship ZdP≧0 is established, the flow advances to step 1708 to perform the pressure decrease operation. As an example of the pressure decreasing operation, the step as shown in the flowchart of FIG. 13C explained in conjunction with the second embodiment can be given.

In step 1701, unless the Ycntrl flag is in the set condition, the flow advances to step 1709 to execute the release operation to release the brake hydraulic pressure within the wheel cylinder 6. As the release operation, the steps as shown in FIG. 13D explained in conjunction with the second embodiment can be given.

In step 1710, the warning process for informing the driver of the operating condition of the grade-holding brake system is executed. In the warning process, for example, the warning process in FIG. 7 explained in conjunction with the first embodiment is executed. Thus, for example, the brake pedal 1 is depressed to bring the vehicle speed to zero so that the brake holding condition is established. When the brake pedal is first released after the above-described brake holding condition has been established, the grade-holding brake system is operative.

Also, step 1702 is to determine whether or not the brake pedal is released by using the brake switch 2. The master cylinder pressure sensor 16 is provided as a braking force detecting means for detecting the braking force on the basis of the pressure within the master cylinder, and, as another modified step, whether or not the brake pedal is depressed may be determined by comparing the pressure within the master cylinder with the predetermined value.

As described above, according to the fifth embodiment, when the brake pedal is first released after the predetermined brake holding condition has been established, the braking force is generated and maintained by the second brake driver.

Accordingly, it is possible to maintain the vehicle in the vehicle stopping condition even if the brake pedal has been released. As a result, it is unnecessary to perform rapid pedal changes from the brake pedal to the accelerator pedal and it is easy to start-off the vehicle on a slope. Also, it is possible to dispense with the need to continuously depress the brake pedal in traffic jams or when waiting for a traffic signal to change. It is therefore possible to reduce the fatigue due to braking. Also, if the brake release condition is met, for example, by depressing the accelerator pedal, since the braking force at this time is released by the second brake driver, it is possible to readily release the vehicle from the vehicle stopping condition without causing the driver to feel that it is troublesome to do so.

EMBODIMENT 6

Figure 17:
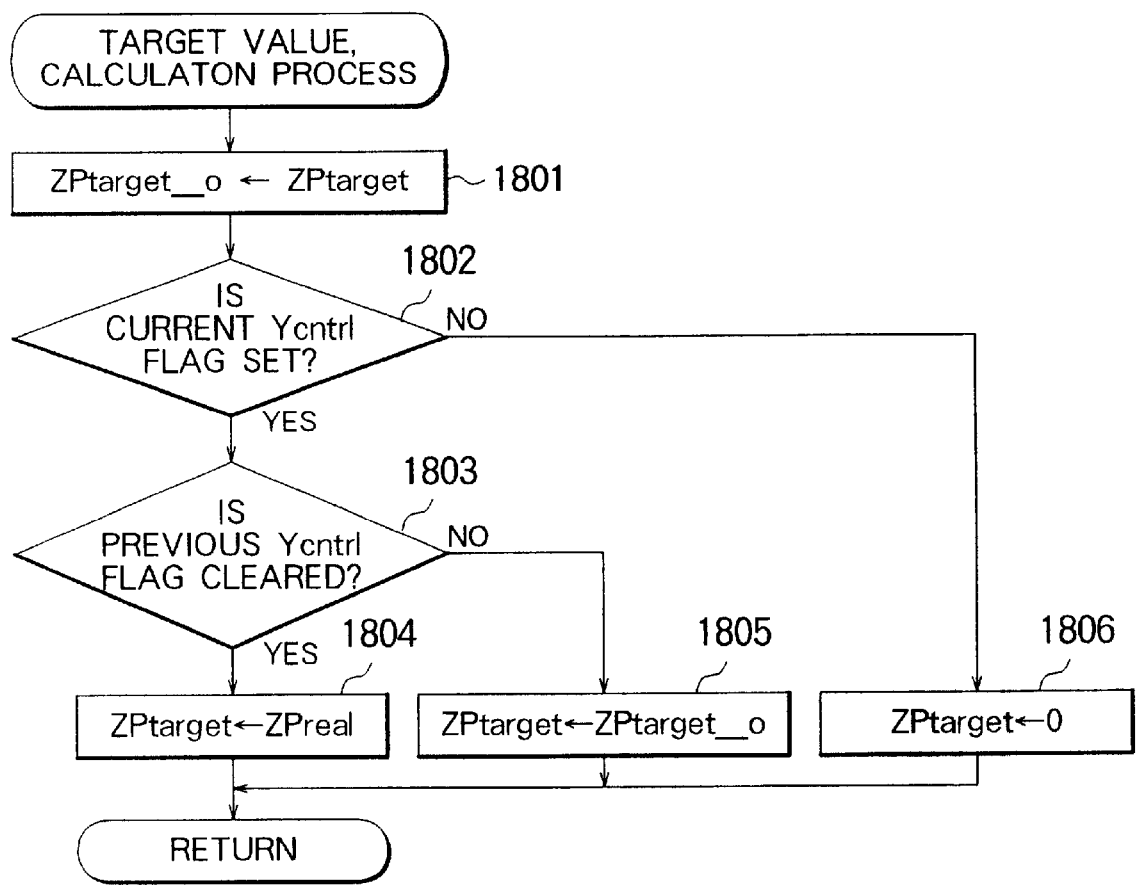
FIG. 17 is a flowchart showing a content of the target value calculation process of the grade-holding brake system according to a sixth embodiment of the present invention.

FIG. 17 is a flowchart showing the content of a target value calculation process of a grade-holding brake system in accordance with a sixth embodiment of the present invention.

The grade-holding brake system according to the sixth embodiment is to change the target value calculation process in accordance with the second embodiment (see FIG. 11).

The flowchart of the target value calculation process in FIG. 17 will now be described. Further, ZPtarget_o, to be described later, is a RAM for temporarily storing the calculation result.

First, in step 1801, the target wheel cylinder pressure ZPtarget of the previous process is stored in the ZPtarget_o. In step 1802, it is determined whether or not the current Ycntrl flag is in the set condition. If the current Ycntrl flag is not in the set condition, the flow advances to step 1806 and zero is substituted for the target wheel cylinder pressure ZPtarget. Also, if the current Ycntrl flag is in the set condition, the flow advances to step 1803 to determine whether or not the Ycntrl of the previous process is in the cleared condition.

If the Ycntrl of the previous process is in the cleared condition, the flow advances to step 1804 to substitute the actually measured wheel cylinder pressure ZPreal for the target wheel cylinder pressure ZPtarget. Also, unless the Ycntrl of the previous process is in the cleared condition, the flow advances to step 1805 to substitute the target wheel cylinder pressure ZPtarget_o of the previous process for the target wheel cylinder pressure ZPtarget.

As described above, when the Ycntrl flag is shifted from the cleared condition to the set condition (i.e., when the brake holding condition is established), the wheel cylinder pressure at this time is set as the target wheel cylinder pressure. Also, the Ycntrl flag continues in the set condition (i.e., the brake holding condition is established), the wheel cylinder pressure from the previous process is maintained. If the Ycntrl flag is in the cleared condition (i.e., when the brake holding condition is not met), it is possible to clear the target wheel cylinder pressure.

As described above, in the grade-holding brake system according to the sixth embodiment of the present invention, when the predetermined brake holding condition is established, the braking force is generated in which the pressure within the wheel cylinder corresponding to the braking force at this time is the target value, and the braking force is maintained. Hence, even if the brake pedal is released, it is possible to maintain the stopped condition of the vehicle with a braking force which is necessary under the circumstances, for example, against the drive torque of the vehicle at idle or on a grade in the road.

Also, by constructing the brake pedal such that it can be further depressed when the target value is greater than the braking force at this time, it is possible for the driver to be informed of the operating condition of the grade-holding brake system by simply resting a foot on the brake pedal.

EMBODIMENT 7

In a grade-holding brake system in accordance with a seventh embodiment of the present invention, in step 1804 of the target value calculation process according to the sixth embodiment (see FIG. 17), the value based on the wheel cylinder pressure ZPreal is substituted for the target wheel cylinder pressure ZPtarget.

For example, a step for detecting the gradient of the road may be provided and the value obtained by multiplying the wheel cylinder pressure ZPreal by a compensation amount corresponding to the gradient of the road may be substituted for the target wheel cylinder pressure ZPtarget.

As described above, in the grade-holding brake system according the seventh embodiment of the present invention, when the predetermined brake holding condition is established, a braking force is generated in which the pressure within the wheel cylinder corresponding to the braking force at this time is the target value, and the braking force is maintained. Even if the brake pedal is released, it is possible to maintain the stopped condition of the vehicle with the braking force that is necessary under the circumstances, for example, under the drive torque of the vehicle or the grade of the road. Also, if the brake pedal is structured so as to be retracted in the depressing direction when the value that is greater than the braking force at this time is the target value, it is possible to inform the driver of the operating condition of the grade-holding brake system by simply resting a foot on the brake pedal.

EMBODIMENT 8

Figure 18:
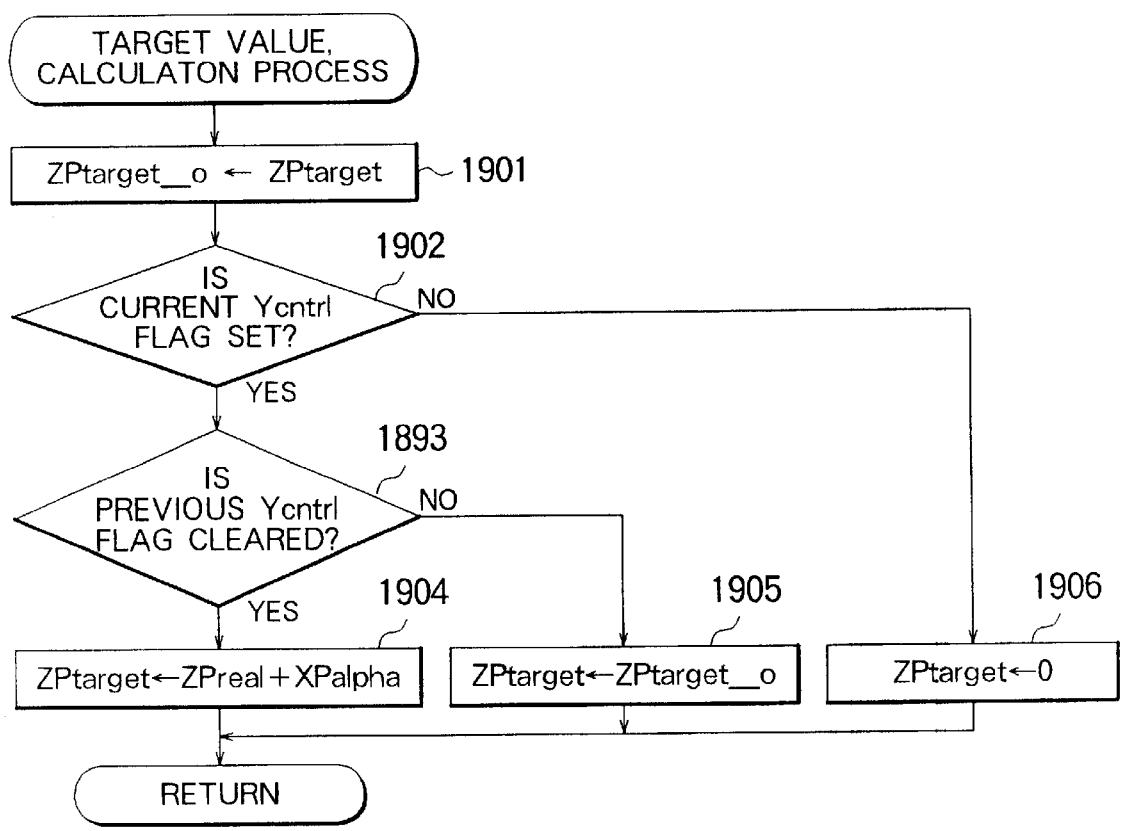
FIG. 18 is a flowchart showing a content of a target value calculation process in a grade-holding brake system according to an eighth embodiment of the present invention.

FIG. 18 is a flowchart showing a content of a target value calculation process of a grade-holding brake system in accordance with an eighth embodiment of the present invention.

The grade-holding brake system according to the eighth embodiment is the assembly in which the target value calculation process in accordance with the second embodiment (see FIG. 11) is changed.

A flowchart of the target value calculation process shown in FIG. 18 will now be described. Further, ZPtarget_o to be described later is a RAM for temporarily storing the calculation result.

First, in step 1901, the target wheel cylinder pressure ZPtarget of the previous process is stored in the ZPtarget_o.

In step 1902, it is determined whether or not the current Ycntrl flag is in the set condition. If the current Ycntrl flag is not in the set condition, the flow advances to step 1906 and zero is substituted for the target wheel cylinder pressure ZPtarget. Also, if the current Ycntrl flag is in the set condition, the flow advances to step 1903 to determine whether or not the Ycntrl of the previous process is in the cleared condition.

In step 1903, if the Ycntrl of the previous process is in the cleared condition, the flow advances to step 1904 to substitute the value obtained by adding the predetermined wheel cylinder pressure ZPalpha to the wheel cylinder pressure ZPreal at this time for the target wheel cylinder pressure ZPtarget.

Also, unless the Ycntrl flag of the previous process is in the cleared condition, the flow advances to step 1905 to substitute the target wheel cylinder pressure ZPtarget_o of the previous process for the target wheel cylinder pressure ZPtarget.

As described above, when the Ycntrl flag is shifted from the cleared condition to the set condition (i.e., when the brake holding condition is established), the pressure obtained by adding the predetermined amount to the wheel cylinder pressure at this time is set as the target wheel cylinder pressure. Also, when the Ycntrl flag continues in the set condition (i.e., the brake holding condition is established), the wheel cylinder pressure from the previous process is continuously maintained. If the Ycntrl flag is in the cleared condition (i.e., when the brake holding condition is not met) it is possible to clear the target wheel cylinder pressure.

As described above, in the grade-holding brake system according to the eighth embodiment of the present invention, when the predetermined brake holding condition is established, a braking force is generated in which the pressure within the wheel cylinder corresponding to the b raking force a t t his time is the target value, and the braking force is maintained. Even if the brake pedal is released, it is possible to maintain the stopped condition of the vehicle with the braking force that is necessary under the circumstances, for example, under the drive torque of the vehicle or the grade of the road. Also, if the brake pedal is structured so as to be retracted in the depressing direction when the value that is greater than the braking force generated by driver's depressing the brake pedal is the target value, it is possible to inform the driver of the operating condition of the grade-holding brake system by simply resting a foot on the brake pedal.

EMBODIMENT 9

Figure 19:
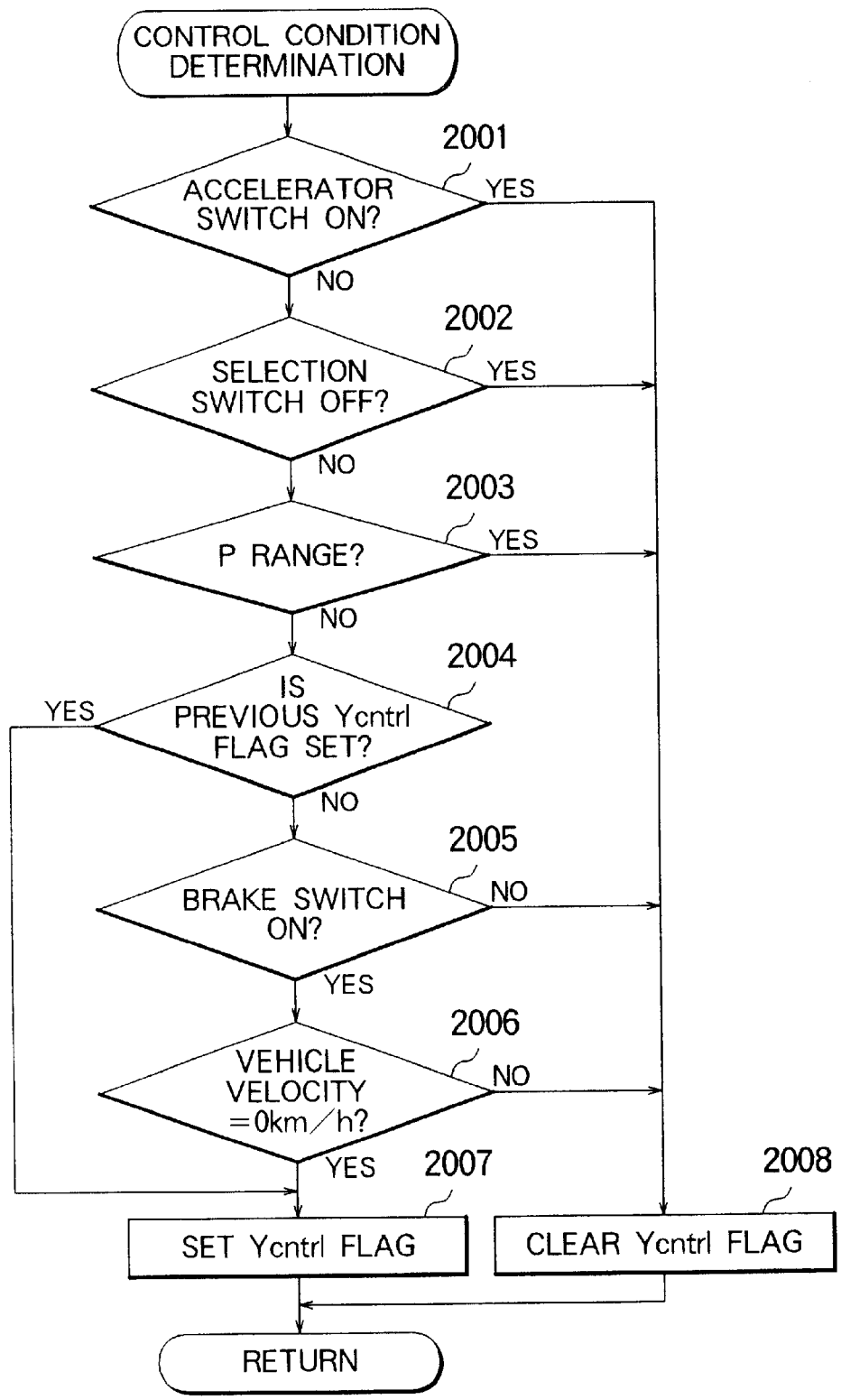
FIG. 19 is a flowchart showing a portion of a control program in a grade-holding brake system according to a ninth embodiment of the present invention.

FIG. 19 is a flowchart showing a portion of a control program in a grade-holding brake system in accordance with a ninth embodiment.

The grade-holding brake system according to the ninth embodiment is the assembly in which the control condition determination in accordance with the first embodiment or the second embodiment is changed. Namely, a selection switch with which the driver selects the operation/non-operation of the grade-holding brake system or a shift range detector for detecting a shift range of an automatic transmission vehicle is electrically connected to the controller 10, and an input process for determining a decision of the condition of the selection switch and the shift range detector are added.

The control condition determination shown in FIG. 19 will now be described.

First, in step 2001, it is determined whether or not the accelerator switch 11 is turned on (depressed condition). Also, in step 2002, it is determined whether or not the selection switch is turned off (non-operating condition). Further, in step 2003, it is determined whether or not the shift range is in P (parking) range.

If the accelerator pedal is depressed, or the selection switch is turned off, or the shift range is in the P range, the flow advances to step 2008. The flow advances to step 2004 unless the status is under any of these modes.

In step 2008, the Ycntrl flag is cleared so that the control condition of the grade-holding brake system is not established. In step 2004, it is determined whether or not the Ycntrl flag of the previous process is in the set condition.

If the Ycntrl flag of the previous process is in the set condition, the flow advances to step 2007 and the Ycntrl flag is set in order to establish the control condition of the grade-holding brake system. Also, when the Ycntrl flag is not in the set condition in the previous process, the flow advances to step 2005.

In step 2005, it is determined whether or not the brake pedal 1 is depressed. Unless the brake pedal 1 is depressed, the program advances to step 2008 to clear the Ycntrl flag. Also, if the brake pedal 1 is depressed, the program advances to step 2006. In step 2006, it is determined whether or not the speed of the vehicle is zero.

Unless the speed of the vehicle is zero, the program advances to step 2008 to clear the Ycntrl flag. Also, if the speed of the vehicle is zero, the program advances to step 2007 to set the Ycntrl flag.

With such a program, by turning the selection switch off or by shifting the gear into the P range, it is possible to make the grade-holding brake system inoperative.

Further, the characteristic portion of the ninth embodiment is the condition determination section for bringing the grade-holding brake system into the non-operating condition in steps 2002 and 2003. The condition determination section from step 2004 to step 2006 for bringing the grade-holding brake system into the operation condition may be the steps of the above-described embodiments 3 to 6. Also, in the ninth embodiment, the grade-holding brake system is provided with both the selection switch and the P shift range, but it is possible to use a grade-holding brake system which has only one of the selection switch and the P shift range.

As described above, in the grade-holding brake system according to the ninth embodiment of the present invention, the selection switch is further provided and the brake release condition is established even when the selection switch is in the OFF condition. Accordingly, it is possible for the driver to select the operation/non-operation of the grade-holding brake system. Also, in the vehicle provided with an automatic transmission, since the brake release condition is also established when the shift range is in the parking range, the grade-holding brake system is released when the shift range is in the parking range. Furthermore, once in the condition that the grade-holding brake system is operated and the brake pedal in a released state, it is possible to release the grade-holding brake system by simply depressing the brake pedal.

EMBODIMENT 10

Figure 20:
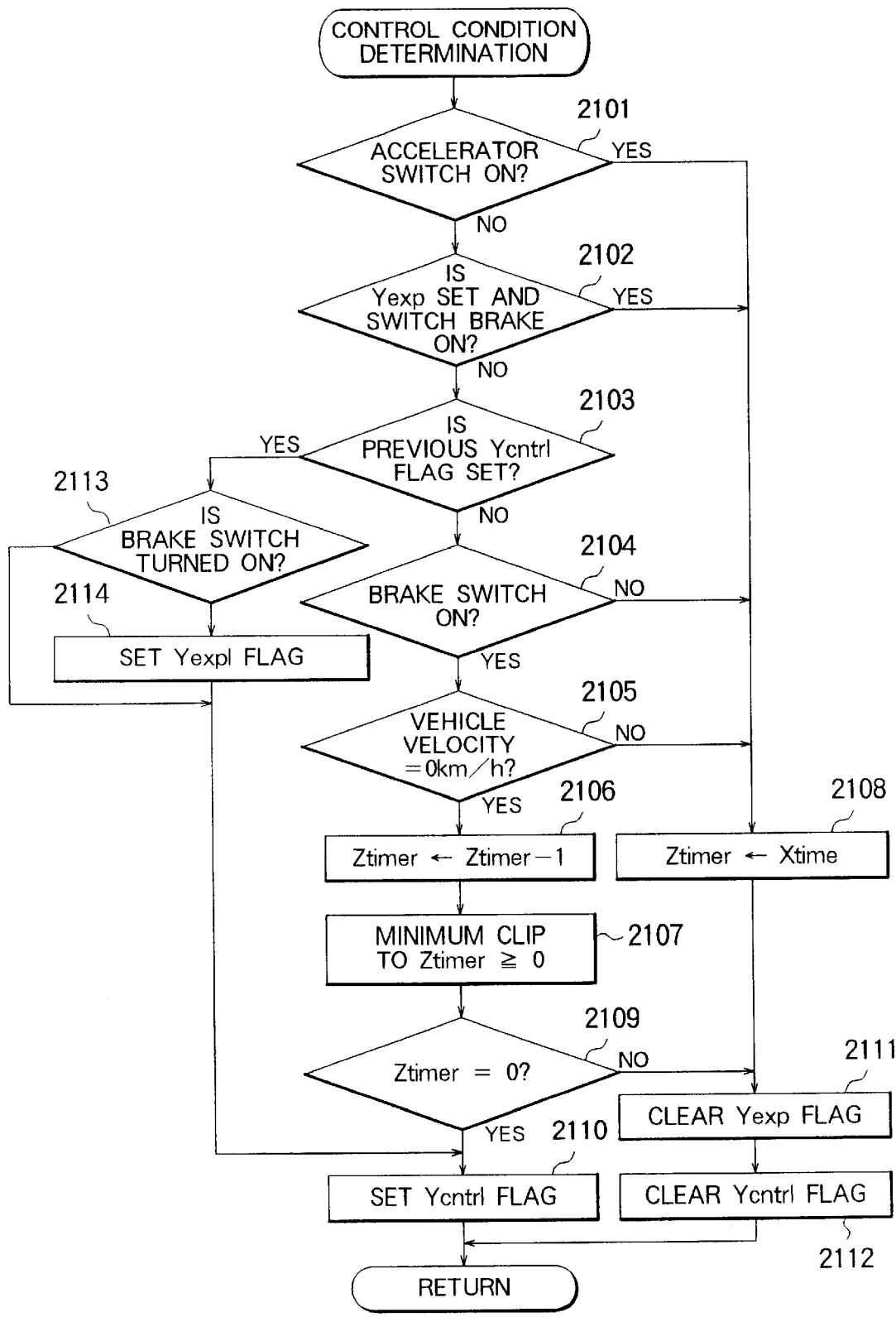
FIG. 20 is a flowchart showing a portion of a control program in a grade-holding brake system according to a tenth embodiment of the present invention.

FIG. 20 is a flowchart showing a portion of a control program in a grade-holding brake system in accordance with a tenth embodiment of the present invention.

The control condition determination according to the tenth embodiment shown in FIG. 20 is such that the process contents (FIGS. 4, 15 and 16) of the control condition determination in accordance with the first embodiment to fourth embodiment are changed.

The grade-holding brake system when the control condition determination (FIG. 15) according to the fourth embodiment is changed will now be described.

First, in step 2101, it is determined whether or not the accelerator switch 11 is in the ON condition (depressed condition).

If the accelerator pedal is depressed, the flow advances to step 2108, and the predetermined value Xtime is stored in the Ztimer. The flow advances to step 2111 to clear a brake release experience flag Yexp. In step 2112, the Ycntrl flag is cleared so that the control condition of the grade-holding brake system is not established.

Also, the flow advances to step 2102 unless the accelerator pedal is depressed. In step 2102, it is determined whether or not the brake release experience flag is in the set condition and the brake switch 2 is turned on. If the brake release experience flag is in the set condition and the brake switch 2 is turned on, the flow advances to step 2108 so that the control condition of the grade-holding brake system is not established.

Also, if the brake release experience flag is in the set condition and the brake switch 2 is not turned on, the flow advances to step 2103. In step 2103, it is determined whether the Ycntrl flag of the previous process is in the set condition.

If the Ycntrl flag in the previous process is in the set condition, the flow advances to step 2113 as a brake re-depress detecting step to determine whether or not the brake switch 2 is in the OFF condition (release condition of the brake pedal 1). If the brake switch 2 is in the OFF condition, the flow advances to step 2114 to set the brake release experience flag Yexp. Also, if the brake switch 2 is under the ON condition, the flow advances, without any processing, to step 2110 and the Ycntrl flag is set so that the control condition of the grade-holding brake system may be established.

Also, in step 2103, unless the Ycntrl flag in the previous process is in the set condition, the flow advances to step 2104.

In step 2104, it is determined whether or not the brake switch 2 is in the ON condition (depressed condition of the brake pedal 1) Unless the brake pedal 1 is depressed, the flow advances to step 2108. Also, if the brake pedal 1 is depressed, the flow advances to step 2105.

In step 2105, it is determined whether or not the speed of the vehicle is zero. If it is determined that the speed of the vehicle is not zero, the flow advances to step 2108. Also, if it is determined that the speed of the vehicle is zero, the flow advances to step 2106 when the Ztimer is decremented. Further, the value of Ztimer is clipped in step 2107 so that its minimum value is equal to o r greater than zero.

In step 2109, it is determined whether or not the Ztimer is zero. Unless the relationship, Ztimer=0, is established, the flow advances to step 2111 and the brake release experience Yexp flag is cleared, and in step 2112 the Ycntrl flag is cleared.

If the relationship Ztimer=0 is established, the flow advances to step 2110 and the Ycntrl flag is set.

Thus, once the control condition of the grade-holding brake system is established, and the brake pedal is then depressed again after having been released, the control condition of the grade-holding brake system can be disabled.

Also, in step 2104, it is determined whether or not the brake pedal is depressed by using the brake switch 2, but it is possible to modify this step so that, it is determined whether or not the brake pedal is depressed by comparing the wheel cylinder pressure with a predetermined value.

Also, the master cylinder pressure sensor 16 is provided for detecting the braking force on the basis of the brake hydraulic pressure applied to the master cylinder 4 (hereinafter referred to as a pressure within the master cylinder), and it is possible to modify the step so that whether or not the brake pedal is depressed is determined by comparing the pressure within the master cylinder with the predetermined value.

Also, step 2113 as a brake re-depress detecting step is to determine whether or not the brake pedal is released by using the brake switch 2. However, the master cylinder pressure sensor 16 is provided for detecting the braking force based on the brake hydraulic pressure applied to the master cylinder 4 (hereinafter referred to as a pressure within the master cylinder), and it is possible to modify this step so that whether or not the brake pedal is released is determined by comparing the pressure within the master cylinder with the predetermined value.

As described above, according to the grade-holding brake system according to the tenth embodiment of the present invention, a brake re-depress detecting step is provided for detecting that the brake pedal has been depressed again when the first or second holding command step is executed and the brake pedal is released; and since the brake release condition is also established when the brake pedal is depressed again, it is possible to release the grade-holding brake system by simply depressing the brake pedal once the grade-holding brake system is operated to release the brake pedal.

For instance, it is assumed that a vehicle stops 3 meters in front of the driver's vehicle and the driver's vehicle itself is stopped by operating the grade-holding brake system. In this situation, if the driver would like to approach the vehicle in front so that the distance between the vehicles becomes one meter, the driver may feel scared to release the grade-holding brake system by depressing the accelerator pedal because the vehicle might abruptly accelerated. However, he may release the grade-holding brake system safely by operating the brake pedal. Accordingly, it is advantageous that the grade-holding brake system may be released safely even during the operation thereof when there is a very short distance to a vehicle.

Further, the brake release condition is also established when the brake pedal is depressed again. Accordingly, it is possible to release the grade-holding brake system by simply depressing the brake pedal once the grade-holding brake system is operated to release the brake pedal.

EMBODIMENT 11

Figure 21:
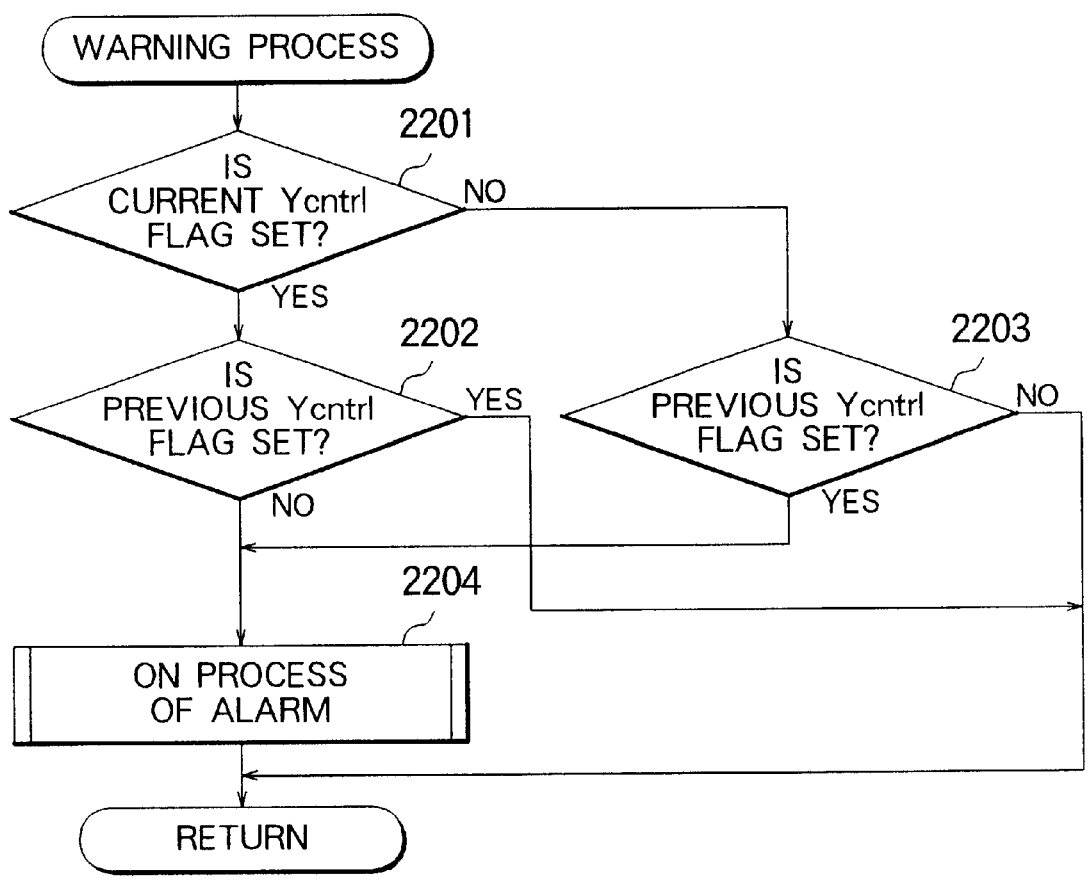
FIG. 21 is a flowchart showing a portion of a control program in a grade-holding brake system according to an eleventh embodiment of the present invention.

FIG. 21 is a flowchart showing a portion of a control program in a grade-holding brake system in accordance with an eleventh embodiment of the present invention.

The grade-holding brake system in accordance with the eleventh embodiment is such that an alarm 13 is provided instead of the lamp 13 in the first or second embodiment, and the warning process (see FIG. 7) is changed. The flowchart of FIG. 21 showing the warning process will now be described.

In step 2201, it is determined whether or not the current Ycntrl flag is in the set condition. Also, in steps 2202 and 2203, it is determined whether or not the Ycntrl flag of the previous process is in the set condition.

According to the determination of steps 2201 to 2203, when the Ycntrl flag is changed from the previous process to the current process, the flow advances to step 2204 as the release warning step to sound the alarm 13. Also, if the Ycntrl flag does not change from the previous process to the current process, the process ends. Thus, in the grade-holding brake system in accordance with the eleventh embodiment, it is possible to sound the alarm 13 when the operating condition of the grade-holding brake system is changed.

Further, in contrast to the above-described case, it is possible to change the system so that according to the determination of steps 2201 to 2203, the alarm 13 may be sounded as a holding alarm step when the Ycntrl flag is not changed from the previous process to the current process. Either, the holding alarm step, the release alarm step may be performed.

As described above, in the grade-holding brake system according to the eleventh embodiment of the present invention, any one of the alarm, the lamp, an announcing device and an indicator is provided for indicating the operating condition of the grade-holding brake system to inform the driver of the operating condition of the grade-holding brake system by sounding, for example, the alarm in response to the establishment/disablement of the brake release condition and the brake holding condition. Accordingly, when the driver makes a mistake in either operating or not operating the grade-holding brake system, it is possible to rapidly and reliably inform the driver of such.

EMBODIMENT 12

Figure 22:
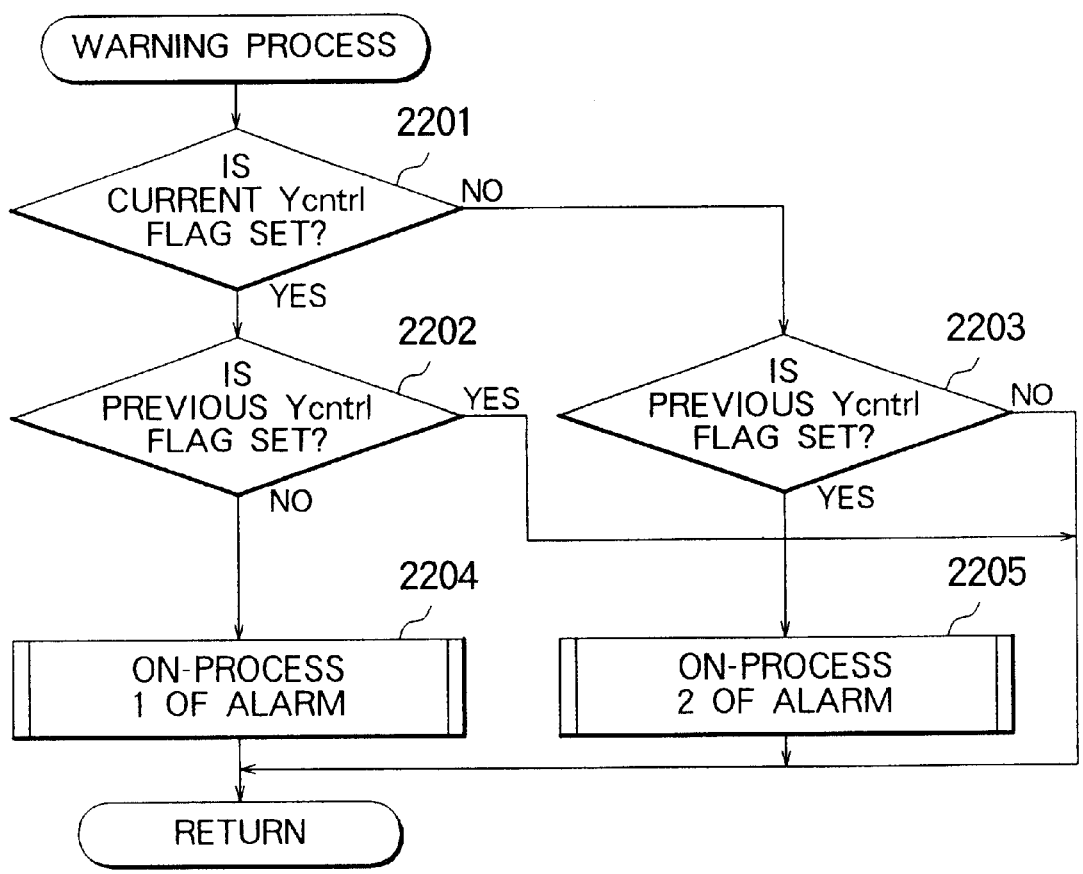
FIG. 22 is a flowchart showing a portion of a control program in a grade-holding brake system according to a twelfth embodiment of the present invention.

FIG. 22 is a flowchart showing a portion of a control program in a grade-holding brake system in accordance with a twelfth embodiment.

The grade-holding brake system in accordance with the twelfth embodiment is such that an alarm 13 is provided instead of the lamp 13 in the first or second embodiment, and the warning process (see FIG. 7) is changed.

A flowchart of FIG. 22 showing the warning process will now be described.

In step 2301, it is determined whether or not the current Ycntrl flag is in the set condition. Also, in steps 2302 and 2303, it is determined whether or not t he Ycntrl flag of the previous process is in the set condition. According to the determination of steps 2301 to 2303, when the Ycntrl flag is changed from the set condition to the cleared condition, the flow advances to step 2304 to sound the alarm 13. Also, when the Ycntrl flag is changed from the cleared condition to the set condition, the flow advances to step 2305 to sound the alarm 13.

Further, it is preferable that the sounds of the alarm in steps 2304 and 2305 are different from each other.

Also, if the Ycntrl flag does not change from the previous process until the current process, the process ends without any further process.

Thus, according to the grade-holding brake system in accordance with the twelfth embodiment, it is possible to sound the alarm 13 with different sounds when the grade-holding brake system is changed between the operating condition and the non-operating condition.

As described above, in the grade-holding brake system according to the twelfth embodiment of the present invention, any one of the alarm, the lamp, the announcing device and the indicator is provided for indicating the operating condition of the grade-holding brake system to inform the driver of the operating condition of the grade-holding brake system by sounding, for example, the alarm in response to the establishment/disablement of the brake release condition and the brake holding condition. Accordingly, when the driver makes a mistake in either operating or not operating the grade-holding brake system, it is possible to rapidly and reliably inform the driver of such.

EMBODIMENT 13

Figure 23:
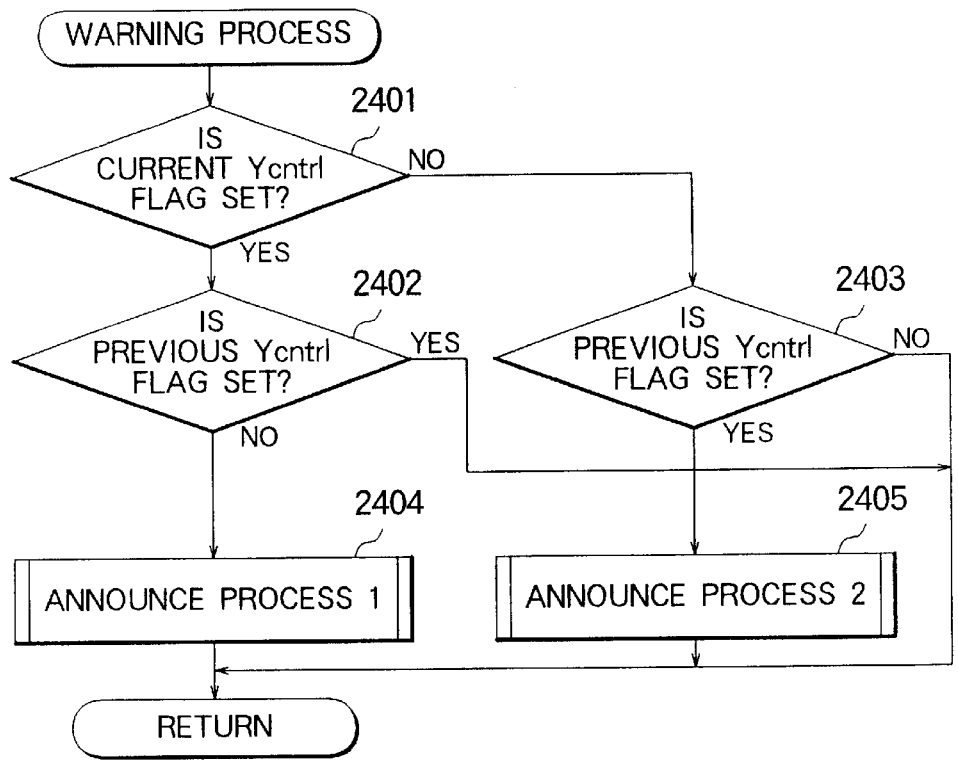
FIG. 23 is a flowchart showing a portion of a control program in a grade-holding brake system according to a thirteenth embodiment of the present invention.

FIG. 23 is a flowchart showing a portion of a control program in a grade-holding brake system in accordance with a thirteenth embodiment.

The grade-holding brake system in accordance with the thirteenth embodiment is such that an announcing device 13 is provided instead of the lamp 13 in the first or second embodiment, and the warning process (see FIG. 7) is changed.

The flowchart of FIG. 23 showing the warning process will now be described.

In step 2401, it is determined whether or not the current Ycntrl flag is in the set condition. Also, in steps 2402 and 2403, it is determined whether or not the Ycntrl flag of the previous process is in the set condition. According to the determination of steps 2401 to 2403, when the Ycntrl flag is changed from the set condition to the cleared condition, the flow advances to step 2404 as a non-operation announcing step to announce a message from the announcing device 13. Also, when the Ycntrl flag is changed from the cleared condition to the set condition, the flow advances to step 2405 as an operation announcing step to announce a message from the announcing device 13.

Further, it is preferable that the contents of the messages of steps 2404 and 2405 are different from each other. Also, if the Ycntrl flag does not change from the previous process to the current process, the process ends. Thus, according to the grade-holding brake system in accordance with the thirteenth embodiment, it is possible to announce the different messages when the grade-holding brake system is changed to the operating condition and the non-operating condition.

As described above, in the grade-holding brake system according to the thirteenth embodiment of the present invention, any one of the alarm, the lamp, the announcing device and the indicator is provided for indicating the operating condition of the grade-holding brake system to inform the driver of the operating condition of the grade-holding brake system by sounding, for example, the alarm in response to the establishment/disablement of the brake release condition and the brake holding condition. Accordingly, when the driver makes a mistake in either operating or not operating the grade-holding brake system, it is possible to rapidly and reliably inform the driver of such.

EMBODIMENT 14

Figure 24:
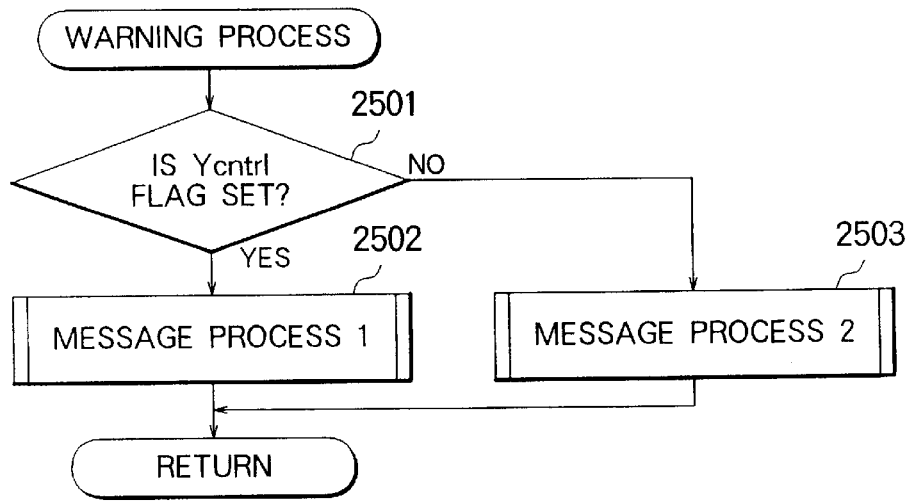
FIG. 24 is a flowchart showing a portion of a control program in a grade-holding brake system according to a fourteenth embodiment of the present invention.

FIG. 24 is a flowchart showing a portion of a control program in a grade-holding brake system in accordance with a fourteenth embodiment.

The grade-holding brake system in accordance with the fourteenth embodiment is such that an indicator 13 is provided instead of the lamp 13 in the first or second embodiment, and the warning process (see FIG. 7) is changed.

A flowchart of FIG. 24 showing the warning process will now be described.

In step 2501, it is determined whether or not the current Ycntrl flag is in the set condition. If the Ycntrl flag is in the set condition, the flow advances to step 2502 as an operation indicating step to indicate a message using the indicator 13. Also, the Ycntrl flag is cleared, the flow advances to step 2503 as a non-operation display step to indicate a message using the indicator 13.

Further, it is preferable that the contents of the messages of steps 2502 and 2503 are different from each other.

Thus, it is possible to indicate different messages when the grade-holding brake system is changed to the operating condition and the non-operating condition.

As described above, in the grade-holding brake system according to the fourteenth embodiment of the present invention, any one of the alarm, the lamp, the announcing device and the indicator is provided for expressing the operating condition of the grade-holding brake system to inform the driver of the operating condition of the grade-holding brake system by sounding, for example, the alarm in response to the establishment/disablement of the brake release condition and the brake holding condition. Accordingly, when the driver makes a mistake in either operating or not operating the grade-holding brake system, it is possible to rapidly and reliably inform the driver of such.

According to the grade-holding brake system of the present invention, the following advantages can be obtained. According to the present invention, there is provided a the grade-holding brake system comprising a master cylinder connected to a booster device for amplifying a pedal force of a brake pedal; a wheel cylinder for converting a pressure fed from the master cylinder into braking force for a wheel; a brake switch for detecting an amount that the brake pedal is depressed; an accelerator switch for detecting an amount that an accelerator pedal is depressed; a vehicle speed sensor for detecting a speed of a vehicle; a pressure controlling means for controlling a pressure within the wheel cylinder independently of the operation of the brake pedal; and a controller for drivingly controlling the pressure controlling means for controlling the pressure within the wheel cylinder, and the controller, for controlling the pressure within the wheel cylinder, performs: a brake depressing amount detecting step for detecting an amount that the brake pedal is depressed on the basis of a detection signal of the brake switch; an accelerator depressing amount detecting step for detecting the amount that the accelerator pedal is depressed on the basis of a detection signal of the accelerator switch; a stopped vehicle determination step for determining a vehicle stopping condition of the vehicle on the basis of a detection signal of the-vehicle speed sensor; a holding condition establishment step for establishing a brake holding condition for holding a brake condition of the brake at least when the brake pedal is depressed and the vehicle is under the vehicle stopping condition; a holding condition release step for establishing a brake release condition for releasing the brake condition of the brake at least when the accelerator pedal is depressed; a first holding command step for sending a pressure holding command to the pressure controlling means for holding the pressure within the wheel cylinder until the brake release condition is established when the brake holding condition is established and the brake release condition is not established; and a pressure decreasing command step for decreasing the pressure within the wheel cylinder for sending a pressure decreasing command to the pressure controlling means for releasing the brake when the brake release condition is established. Accordingly, it is unnecessary to perform abrupt pedal changes from the brake pedal to the accelerator pedal, to thereby readily start the vehicle off on the slope. Also, it is possible to dispense with the continuous depression on the brake pedal while in a traffic jam or when waiting for a signal change. Thus, it is possible to reduce fatigue caused by repetitious braking. Also, when the brake release condition is established by, for example, depressing the accelerator pedal, the brake holding condition is released. Accordingly, it is possible to readily release the vehicle from the vehicle stopping condition without causing the driver to feel that the operation is troublesome.

The grade-holding brake system, further comprising a wheel cylinder pressure detector for detecting the pressure within the wheel cylinder; and a pressure increasing means drivingly controlled by the controller for increasing the pressure within the wheel cylinder independently of the operation of the brake pedal. The controller, for controlling the pressure within the wheel cylinder, further performs: a target pressure setting step for setting a target pressure needed within the wheel cylinder to obtain a target braking force; a comparison determination step for comparing a detected pressure of the wheel cylinder pressure detector with the target pressure; and a second holding command step for, when the brake holding operation by means of the pressure controlling means is established and the brake release condition is not established, performing the first holding command step when the detected pressure is higher than the target pressure and for increasing the pressure within the wheel cylinder up to the target pressure by means of the pressure increasing means, and at the same time, holding the pressure within the wheel cylinder until the brake release condition is established. Accordingly, even if the brake holding condition is established, there is no fear that the braking force of the brake will be insufficient and it is possible to reliably keep the vehicle stopped until the brake release condition is established.

Also, the grade-holding brake system, further comprising a braking force detecting means for detecting the braking force. The brake holding condition is established at least when the brake pedal is depressed, and when the vehicle is at a standstill, and when the braking force is continued for a predetermined period of time equal to or longer than a predetermined value. Accordingly, it is possible to reliably keep the vehicle stopped because a braking force, adjusted by the driver greater than the braking force required to keep the vehicle stopped is maintained. Also, when the vehicle is stopped for a short time by operation of the brake pedal, the grade-holding brake system is not operated, and on the other hand, when the vehicle is stopped for a long time, the grade-holding brake system is operated. Accordingly, in a traffic jam in which the vehicle is repeatedly started-off and stopped, it is possible to move the vehicle while appropriately selecting the operation/non-operation of the grade-holding brake system.

Further, the brake holding condition is established at least when the brake pedal is depressed, and the vehicle is stopped for a predetermined period of time. Accordingly, when the vehicle is stopped for a short time by operation of the brake pedal, the grade-holding brake system is not operated, and on the other hand, when the vehicle is stopped for a long time, the grade-holding brake system is operated. Accordingly, in a traffic jam, in which the vehicle is repeatedly started-off and stopped, it is possible to move the vehicle while appropriately selecting the operation/non-operation of the grade-holding brake system.

Moreover, the second holding command step is to hold or increase the pressure within the wheel cylinder with the pressure increasing means for holding the pressure within the wheel cylinder to the target pressure when the brake pedal is first released after the brake holding condition has been established. Thus, even if the brake pedal is released, the stopped condition of the vehicle is reliably maintained. Accordingly, it is unnecessary to perform abrupt pedal changes from the brake pedal to the accelerator pedal, to thereby readily start the vehicle off on the slope. Also, it is possible to dispense with the need to continuously depress the brake pedal in a traffic jam or when waiting for a signal change. Thus, it is possible to suppress the fatigue caused by the braking. Also, for example, if the brake release condition is established by depressing the accelerator pedal, the brake holding condition is released. Accordingly, it is possible to readily release the vehicle from the vehicle stopping condition without causing the driver to feel that the operation is troublesome.

Also, the target pressure setting step is to set a pressure as the target pressure based upon the pressure within the wheel cylinder when the brake holding condition is established. Accordingly, even if the brake pedal is released, it is possible to reliably maintain the stopped condition of the vehicle with the braking force which is necessary under the circumstances, for example, under the conditions of the drive torque of the vehicle at idle or the grade of the road. Also, if the brake pedal is structured so as to be retracted in the depressing direction when the target value is greater than the braking force at this time, it is possible to inform the driver of the operating condition of the grade-holding brake system by simply putting the driver's foot on the brake pedal.

Moreover, the target pressure setting step is to set the pressure within the wheel cylinder as the target pressure when the brake holding condition is established. Accordingly, even if the brake pedal is released, it is possible to stably maintain the stopped condition of the vehicle with the braking force which is necessary under the circumstances, for example, under the conditions of the drive torque of the vehicle or the grade of the road. Also, if the brake pedal is structured so as to be retracted in the depressing direction when the target value is greater than the braking force at this time, it is possible to alarm the operating condition of the grade-holding brake system to the driver by simply putting the driver's foot on the brake pedal.

Further, the target pressure setting step comprises a step for setting the target pressure obtained by adding a predetermined value to the pressure within the wheel cylinder when the brake holding condition is established. Accordingly, even if the brake pedal is released, it is possible to stably maintain the stopped condition of the vehicle with the braking force which is necessary under the circumstances, for example, under the conditions of drive torque of the vehicle or the grade of the road. Also, if the brake pedal is structured so as to be retracted in the depressing direction when the target value is greater than the braking force at this time, it is possible to inform the driver of the operating condition of the grade-holding brake system to the driver by simply putting the driver's foot on the brake pedal.

Moreover, the grade-holding brake system, further comprising: a selection switch for allowing a driver to select operation/non-operation of the grade-holding brake system, in which the brake release condition is established even if the selection switch is in non-operating condition. Accordingly, the brake release condition is established even when the selection switch is in the OFF condition so that, it is possible for the driver to select the operation/non-operation of the grade-holding brake system.

The controller further performs a shift range detecting step for detecting a shift range selected by a driver in the vehicle provided with an automatic transmission, and the brake release condition may also be established when the shift range is in a park. Accordingly, when the stopped vehicle condition is maintained by shifting into park, it is unnecessary to operate the grade-holding brake system.

Further, in the grade-holding brake system, the controller further performs a brake re-depress detecting step for detecting that the brake pedal is depressed again when the first and/or second holding command step(s) are/is executed and the brake pedal is released, and the brake release condition is established even when the brake pedal is depressed again. Accordingly, once the grade-holding brake system is operated to release the brake pedal, it is possible to release the brake holding condition of the grade-holding brake system by simply depressing the brake pedal. For instance, assuming that a vehicle is stopped 3 meters in front of the driver's vehicle which is stopped by operating the grade-holding brake system. If the driver would like to be only one meter away from the vehicle in front, the driver may feel scared to release the grade-holding brake system by depressing the accelerator pedal because the vehicle might abruptly accelerate, but he may safely release the grade-holding brake system by operating the brake pedal. Accordingly, it is advantageous in that the grade-holding brake system may be safely released even if the grade-holding brake system is operated when there is a very short distance to a vehicle in front. Accordingly, when the grade-holding brake system is operated with a very short distance to a vehicle in front, it is possible to release the brake holding condition of the grade-holding brake system in safety.

Also, the pressure controlling means comprises a first cut-off valve disposed in a first brake tubing for connecting the master cylinder and the wheel cylinder to each other for opening/closing the first cut-off valve to hold or decrease the pressure within the wheel cylinder. Accordingly, it is unnecessary to perform abrupt pedal changes from the brake pedal to the accelerator pedal, to thereby readily start the vehicle off on the slope. Also, there is no need to continuously depress the brake pedal in a traffic jam or while waiting for a signal change. Thus, it is possible to reduce the fatigue caused by braking. Also, for example, if the predetermined brake release condition is established by depressing the accelerator pedal, the brake holding condition is released. Accordingly, it is possible to readily release the vehicle from the vehicle stopping condition without making the driver feel that the operation is troublesome.

Further, the pressure increasing means comprises a pressure booster means disposed in parallel with the first brake tubing in a brake tubing for connecting the master cylinder and the wheel cylinder to each other, and a second cut-off valve disposed at least closer to the master cylinder than the pressure booster means, whereby the pressure within the wheel cylinder is increased or held by using the pressure booster means and the second cut-off valve to thereby control the braking force. Accordingly, even if the brake holding condition is established, there is no fear that the braking force of the brake is insufficient, and it is possible to stop the vehicle without fail until the brake release condition is established.

Further, either the brake depressing amount detecting step or the brake re-depress detecting step is performed by a brake switch for outputting the fact that the brake pedal is depressed to a predetermined depth. Any one of the brake depressing amount detecting step and the brake re-depress detecting step is performed by the brake switch for outputting that the brake pedal is depressed to a predetermined depth, the master cylinder pressure detector for detecting the hydraulic pressure at a location closer to the master cylinder than the cut-off valve, or the wheel cylinder pressure detector for detecting the hydraulic pressure at a location closer to the wheel cylinder than the cut-off valve, to thereby reliably keep the vehicle stopped.

Moreover, anyone of the brake depressing amount detecting step and the brake re-depress detecting step is performed by a master cylinder pressure detector for detecting a pressure at a location closer to the master cylinder than the first cut-off valve. Any one of the brake depressing amount detecting step and the brake re-depress detecting step is performed by the brake switch for outputting that the brake pedal is depressed to a predetermined depth, the master cylinder pressure detector for detecting the hydraulic pressure at a location closer to the wheel cylinder than the cut-off valve, or the wheel cylinder pressure detector for detecting the hydraulic pressure at a location closer to the side of the wheel cylinder than the cut-off valve, to thereby stop the vehicle without fail.

Also, the brake depressing amount detecting step is performed by a wheel cylinder pressure detector for detecting a pressure closer to the wheel cylinder than the first cut-off valve.

Any one of the brake depressing amount detecting step and the brake re-depress detecting step is performed by the brake switch for outputting that the brake pedal is depressed to a predetermined depth, the master cylinder pressure detector for detecting the hydraulic pressure at a location closer to the master cylinder than the cut-off valve, or the wheel cylinder pressure detector for detecting the hydraulic pressure at a location closer to the master cylinder than the cut-off valve, to thereby reliably keep the vehicle stopped.

Moreover, the grade-holding brake system, further comprising an alarm for informing the driver of the operation/non-operation of the grade-holding brake system, in which the controller further performs at least one of a holding alarm step for sounding the alarm when the brake holding condition is established and when the brake release condition is not established and a release alarm step for sounding the alarm when the brake release condition is established. Accordingly, any one of the alarm, the lamp, the announcing device and the indicator is provided for indicating the operating condition of the grade-holding brake system to inform the driver of the operating condition of the grade-holding brake system by sounding, for example, the alarm in response to the establishment/disablement of the brake release condition and the brake holding condition. Accordingly, when the driver makes a mistake in either operating or not operating the grade-holding brake system, it is possible to rapidly and reliably inform the driver of such.

Further, the alarm sound of the holding alarm step is different from the alarm sound of the release alarm step. Accordingly, any one of the alarm, the lamp, the announcing device and the indicator is provided for indicating the operating condition or the operative condition of the grade-holding brake system to inform the driver of the operating condition of the grade-holding brake system by sounding, for example, the alarm in response to the establishment/disablement of the brake release condition and the brake holding condition. Accordingly, when the driver makes a mistake in either operating or not operating the grade-holding brake system, it is possible to rapidly and reliably inform the driver of such.

Also, the grade-holding brake system, further comprising a lamp for informing the driver of the operation/non-operation of the grade-holding brake system, and the controller further performs a lighting step for lighting the lamp until the brake release condition is established when the brake holding condition is established, and when the brake release condition is not established, and when a turn-off step for turning the lamp off when the brake release condition is established. Accordingly, any one of the alarm, the lamp, the announcing device and the indicator is provided for informing the operating condition of the grade-holding brake system to inform the driver of the operating condition of the grade-holding brake system by sounding the alarm, for example, in response to the establishment/disablement of the brake release condition and the brake holding condition. Accordingly, also when the driver makes a mistake in either operating or not operating the grade-holding brake system, it is possible to rapidly and reliably inform the fact to the driver of such.

Further, the grade-holding brake system, further comprising an announcing device for informing the driver of the operation/non-operation of the grade-holding brake system, and the controller further performs either one of an operation announcing step for announcing a message indicating the operation of the grade-holding brake system when the brake holding condition is established and when the brake release condition is not established or a non-operation announcing step for announcing a message indicating the non-operation of the grade-holding brake system when the brake release condition is established. Accordingly, any one of the alarm, the lamp, the announcing device and the indicator is provided for indicating the operating condition or the operative condition of the grade-holding brake system to inform the driver of the operating condition of the grade-holding brake system by sounding, for example, the alarm in response to the establishment/disablement of the brake release condition and the brake holding condition. Accordingly, when the driver makes a mistake in either operating or not operating the grade-holding brake system, it is possible to rapidly and reliably inform the driver of such.

The grade-holding brake system, further comprising an indicator for informing the driver of the operation/non-operation of the grade-holding brake system, and the controller further performs anyone of an operation display step for displaying a message indicating the operation of the grade-holding brake system until the brake release condition is established when the brake holding condition is established and the brake release condition is not established and a non-operation indicating step for displaying a message indicating the non-operation of the grade-holding brake system when the brake release condition is established. Accordingly, any one of the alarm, the lamp, the announcing device and the indicator is provided for indicating the operating condition or the operative condition of the grade-holding brake system to inform the driver of the operating condition of the grade-holding brake system by sounding the alarm, for example, in response to the establishment/disablement of the brake release condition and the brake holding condition. Accordingly, when the driver makes a mistake in either operating or not operating the grade-holding brake system, it is possible to rapidly and reliably inform the driver of such.

Various details of the invention may be changed without departing from the spirit or scope thereof as defined by the appended claims. Furthermore, the foregoing description of the embodiments according to the present invention is provided for the purpose of illustration only, and not for the purpose of limiting the invention in any mannner.

What is claimed is:

1. A grade-holding brake system for a vehicle comprising:
   a master cylinder connected to a booster device for amplifying a brake force applied by a driver to a brake pedal;
   a wheel cylinder for converting a pressure fed from said master cylinder into a braking force for a wheel;
   a brake switch for detecting an amount of depression of said brake pedal;
   an accelerator switch for detecting an amount of depression of an accelerator pedal;
   a vehicle speed sensor for detecting a speed of a vehicle on which said system is mounted;
   a wheel cylinder pressure detector for detecting the pressure within said wheel cylinder; and
   a pressure increase means controlled by said controller for increasing the pressure within said wheel cylinder independent of the operation of the brake pedal;
   a pressure controlling means for controlling the pressure within said wheel cylinder independent of the operation of the brake pedal; and
   a controller for controlling actuation of said pressure controlling means for controlling the pressure within said wheel cylinder,
   wherein said controller performs:
      a brake pedal depression detecting step for detecting whether said brake pedal is being depressed or not on the basis of a detection signal of said brake switch;
      an accelerator pedal depression detecting step for detecting whether said accelerator pedal is being depressed on the basis of a detection signal of said accelerator switch;
      a vehicle halted determination step for determining a vehicle-halted state of the vehicle on the basis of a detection signal of said vehicle speed sensor;
      a holding condition establishment step for establishing a brake holding condition for holding a braked condition of a brake at least when the brake pedal is depressed and when the vehicle is in the vehicle halted condition;
      a holding condition release step for establishing a brake release condition for releasing the braked condition of the brake at least when the accelerator pedal is depressed;
      a first holding command step for sending a pressure holding command to said pressure controlling means and maintaining the pressure within said wheel cylinder until the brake release condition is established when the brake holding condition is established and when the brake release condition is not established;
      a pressure decrease command step for sending a pressure decrease command to said pressure controlling means to decrease the pressure within said wheel cylinder to thereby release the brake when the brake release condition is established;
      a target pressure setting step for setting a target pressure within said wheel cylinder to obtain a target braking force;
      a comparative determination step for determining a difference between a detected pressure of said wheel cylinder pressure detector and the target pressure; and
      a second holding command step for, when the brake holding operation by said pressure controlling means is established and when the brake release condition is not established, performing said first holding command step when the detected pressure is higher than the target pressure, and for increasing the pressure within said wheel cylinder up to the target pressure by said pressure increasing means, and at the same time, maintaining the pressure within said wheel cylinder until the brake release condition is established when the detected pressure is lower than the target pressure.

2. A grade-holding brake system according to claim 1, further comprising a lamp for informing the driver of the operation/non-operation of said grade-holding brake system, wherein said controller further performs a lighting step for lighting said lamp until the brake release condition is established when the brake holding condition is established and when the brake release condition is not established, and a turn-off step for turning said lamp off when the brake release condition is established.

3. A grade-holding brake system according to claim 1, further comprising: a braking force detecting means for detecting the braking force, wherein the brake holding condition is established at least when said brake pedal is depressed, and when the vehicle is at a standstill, and when a braking force equal to or greater than a predetermined value continues for a predetermined period of time.

4. A grade-holding brake system according to claim 1, wherein the brake holding condition is established at least when the brake pedal is depressed, and when the condition that the vehicle is stopped is continued for a predetermined period of time.

5. A grade-holding brake system according to claim 1, wherein said second holding command step comprises a step for maintaining or increasing the pressure within said wheel cylinder by virtue of said pressure increasing means for maintaining the pressure within said wheel cylinder at the target pressure when the brake pedal is first released after the brake holding condition has been established.

6. A grade-holding brake system according to claim 1, wherein said target pressure setting step comprises a step for setting the pressure within said wheel cylinder as the target pressure when the brake holding condition is established.

7. A grade-holding brake system according to claim 1, wherein said target pressure setting step comprises a step for setting a pressure as the target pressure based upon the pressure within said wheel cylinder when the brake holding condition is established.

8. A grade-holding brake system according to claim 1, wherein said target pressure setting step comprises a step for setting the target pressure obtained by adding a predetermined value to the pressure within said wheel cylinder when the brake holding condition is established.

9. A grade-holding brake system according to claim 1, further comprising a selection switch for allowing a driver to select operation/non-operation of said grade-holding brake system, wherein the brake release condition is established even if the selection switch is in a non-operating condition.

10. A grade-holding brake system according to claim 1, wherein said controller further performs a shift range detecting step for detecting a shift range selected by a driver in a vehicle provided with an automatic transmission, wherein the brake release condition may also be established when the shift range is in park.

11. A grade-holding brake system according to claim 1, wherein said controller further performs a brake re-depress detecting step for detecting that the brake pedal has been depressed again when the first and/or second holding command step(s) are/is executed and the brake pedal is released, and wherein the brake release condition is established when the brake pedal is depressed again.

12. A grade-holding brake system according to claim 1, wherein said pressure controlling means comprises a first cut-off valve disposed in a first brake tubing for connecting the master cylinder and the wheel cylinder to each other for opening/closing said first cut-off valve to hold or decrease the pressure within said wheel cylinder.

13. A grade-holding brake system according to claim 1, wherein said pressure increase means comprises a pressure booster means disposed in parallel with said first brake tubing in a brake tubing for connecting said master cylinder and said wheel cylinder to each other, and a second cut-off valve disposed closer to said master cylinder than said pressure booster means, wherein the pressure within said wheel cylinder is increased or held by using said pressure booster means and said second cut-off valve to thereby control the braking force.

14. A grade-holding brake system according to claim 11, wherein one of said brake depressing amount detecting step and said brake re-depress detecting step is performed by a brake switch for outputting that the brake pedal is depressed to a predetermined depth.

15. A grade-holding brake system according to claim 1, further comprising an announcing device for notifying the driver of the operation/non-operation of said grade-holding brake system to the driver, wherein said controller further performs one of an operation announcing step for announcing a message indicating the operation of said grade-holding brake system when the brake holding condition is established and when the brake release condition is not established, and a non-operation announcing step for announcing a message the non-operation of said grade-holding brake system when the brake release condition is established.

16. A grade-holding brake system according to claim 12, wherein said brake depressing amount detecting step is performed by a wheel cylinder pressure detector for detecting a pressure at a location closer to the wheel cylinder than said first cut-off valve.

17. A grade-holding brake system according to claim 1, further comprising an alarm for informing the driver of the operation/non-operation of said grade-holding brake system, wherein said controller further performs at least one of a holding alarm step for sounding said alarm when the brake holding condition is established when and the brake release condition is not established, and a release alarm step for sounding said alarm when the brake release condition is established.

18. A grade-holding brake system according to claim 17, wherein the alarm sound of the holding alarm step is different from the alarm sound of the release alarm step.

19. A grade-holding brake system for a vehicle comprising:
   a master cylinder connected to a booster device for amplifying a brake force applied by a driver to a brake pedal;
   a wheel cylinder for converting a pressure fed from said master cylinder into a braking force for a wheel;
   a brake switch for detecting an amount of depression of said brake pedal;
   an accelerator switch for detecting an amount of depression of an accelerator pedal;
   a vehicle speed sensor for detecting a speed of a vehicle on which said system is mounted;
   a pressure controlling means for controlling the pressure within said wheel cylinder independent of the operation of the brake pedal; and
   a controller for controlling actuation of said pressure controlling means for controlling the pressure within said wheel cylinder,
   wherein said controller performs:
      a brake pedal depression detecting step for detecting whether said brake pedal is being depressed or not on the basis of a detection signal of said brake switch;
      an accelerator pedal depression detecting step for detecting whether said accelerator pedal is being depressed on the basis of a detection signal of said accelerator switch;
      a vehicle halted determination step for determining a vehicle-halted state of the vehicle on the basis of a detection signal of said vehicle speed sensor;
      a holding condition establishment step for establishing a brake holding condition for holding a braked condition of a brake at least when the brake pedal is depressed and when the vehicle is in the vehicle halted condition;

a holding condition release step for establishing a brake release condition for releasing the braked condition of the brake at least when the accelerator pedal is depressed;

a first holding command step for sending a pressure holding command to said pressure controlling means and maintaining the pressure within said wheel cylinder until the brake release condition is established when the brake holding condition is established and when the brake release condition is not established; and a pressure decrease command step for sending a pressure decrease command to said pressure controlling means to decrease the pressure within said wheel cylinder to thereby release the brake when the brake release condition is established, wherein one of said brake depressing amount detecting step and said brake re-depress detecting step, for detecting that the brake pedal has been depressed again when the first and/or second holding command step(s) is/arc executed and the brake pedal is released, is preformed by a master cylinder pressure detector for detecting a pressure at a location closer to the master cylinder than said first cut-off valve.

* * * * *